United States Patent
Taki

(10) Patent No.: US 11,879,796 B2
(45) Date of Patent: Jan. 23, 2024

(54) FORCE TORQUE SENSOR DEVICE INCLUDING SENSOR CHIP BONDED TO STRAIN BODY BY ADHESIVE

(71) Applicant: MINEBEA MITSUMI Inc., Nagano (JP)

(72) Inventor: Tomohito Taki, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 125 days.

(21) Appl. No.: 17/064,705

(22) Filed: Oct. 7, 2020

(65) Prior Publication Data

US 2021/0123824 A1    Apr. 29, 2021

(30) Foreign Application Priority Data

Oct. 29, 2019   (JP) .................................. 2019-196242

(51) Int. Cl.
*G01L 1/26* (2006.01)
*G01L 1/18* (2006.01)

(52) U.S. Cl.
CPC . *G01L 1/26* (2013.01); *G01L 1/18* (2013.01)

(58) Field of Classification Search
CPC .................................... G01L 1/26; G01L 1/18
See application file for complete search history.

(56) References Cited

U.S. PATENT DOCUMENTS

| | | | | |
|---|---|---|---|---|
| 6,211,772 B1* | 4/2001 | Murakami | ............ | G01L 9/0054 257/419 |
| 6,448,624 B1* | 9/2002 | Ishio | ....................... | G01P 1/006 438/50 |
| 6,521,966 B1* | 2/2003 | Ishio | ..................... | G01L 19/147 257/419 |
| 6,810,736 B2* | 11/2004 | Ikezawa | ................. | G01P 15/125 73/493 |
| 6,823,744 B2 | 11/2004 | Ohsato et al. | | |
| 6,906,412 B2* | 6/2005 | Furukubo | ............... | H01L 24/32 257/729 |
| 7,163,739 B2* | 1/2007 | Koike | ..................... | B32B 27/08 428/354 |
| 7,234,358 B2* | 6/2007 | Saito | ..................... | G01L 19/143 73/753 |

(Continued)

FOREIGN PATENT DOCUMENTS

| | | |
|---|---|---|
| EP | 3404390 | 11/2018 |
| JP | S50-093785 | 7/1975 |

(Continued)

OTHER PUBLICATIONS

Extended European Search Report dated Mar. 29, 2021 (EP Patent Application No. 20203615.8).

(Continued)

*Primary Examiner* — Tran M. Tran
(74) *Attorney, Agent, or Firm* — IPUSA, PLLC

(57) ABSTRACT

A force torque sensor device includes a sensor chip that detects a displacement in a predetermined axis direction, a strain body that transmits an applied force to the sensor chip, and an adhesive that bonds the sensor chip to the strain body. The Young's modulus of the adhesive is greater than or equal to 130 MPa and less than or equal to 1.5 GPa.

3 Claims, 15 Drawing Sheets

(56) References Cited

U.S. PATENT DOCUMENTS

| | | | | |
|---|---|---|---|---|
| 7,296,456 B2 * | 11/2007 | Ushida | B21K 1/30 | |
| | | | 72/356 | |
| 7,572,659 B2 * | 8/2009 | Tsubaki | G01P 1/023 | |
| | | | 438/109 | |
| 8,033,009 B2 * | 10/2011 | Kuriyama | G01L 1/2268 | |
| | | | 29/829 | |
| 8,113,065 B2 * | 2/2012 | Ohsato | G01L 1/18 | |
| | | | 29/610.1 | |
| 9,190,537 B2 * | 11/2015 | Ashida | H01L 29/84 | |
| 9,613,938 B2 * | 4/2017 | Suzu | H01L 24/48 | |
| 9,835,508 B2 * | 12/2017 | Kazama | G01L 9/0055 | |
| 10,577,524 B2 * | 3/2020 | Yamamoto | C09J 175/04 | |
| 10,801,904 B2 * | 10/2020 | Yamaguchi | G01L 1/2218 | |
| 10,928,263 B2 * | 2/2021 | Hosokawa | G01L 19/0681 | |
| 10,955,305 B2 * | 3/2021 | Takimoto | H01L 29/84 | |
| 10,962,434 B2 * | 3/2021 | Ikesho | G01L 19/14 | |
| 11,186,750 B2 * | 11/2021 | Yamanari | C09J 133/08 | |
| 11,187,599 B2 * | 11/2021 | Shun | G01L 1/2237 | |
| 11,219,122 B2 * | 1/2022 | Sato | G01C 9/02 | |
| 11,254,561 B2 * | 2/2022 | Duqi | G01L 1/26 | |
| 11,355,357 B2 * | 6/2022 | Mawatari | H01L 25/043 | |
| 2003/0140713 A1 * | 7/2003 | Ohsato | G01L 5/162 | |
| | | | 73/862.041 | |
| 2006/0283248 A1 * | 12/2006 | Sugano | B81B 3/0072 | |
| | | | 73/514.16 | |
| 2008/0156112 A1 * | 7/2008 | Sakurai | G01L 1/2281 | |
| | | | 73/862.474 | |
| 2010/0199783 A1 * | 8/2010 | Sakurai | G01P 15/18 | |
| | | | 73/514.33 | |
| 2012/0049300 A1 * | 3/2012 | Yamaguchi | G01L 19/147 | |
| | | | 438/51 | |
| 2019/0320526 A1 | 10/2019 | Sato et al. | | |
| 2020/0186120 A1 * | 6/2020 | Segovia Fernandez | | |
| | | | H03H 9/145 | |
| 2021/0055095 A1 | 2/2021 | Asakawa et al. | | |

FOREIGN PATENT DOCUMENTS

| | | | | |
|---|---|---|---|---|
| JP | H05-209766 | 8/1993 | | |
| JP | 2001-147337 | 5/2001 | | |
| JP | 4011345 | 11/2007 | | |
| JP | 2019-132615 | 8/2019 | | |
| JP | 2019-184452 | 10/2019 | | |
| WO | WO-2018066557 A1 * | 4/2018 | | G01L 1/22 |
| WO | 2019142860 | 7/2019 | | |
| WO | 2019146696 | 8/2019 | | |

OTHER PUBLICATIONS

Office Action dated Jun. 20, 2023 with respect to the corresponding Japanese patent application No. 2019-196242.

Office Action dated Aug. 29, 2023 issued with respect to the corresponding Japanese application No. 2019-196242.

* cited by examiner

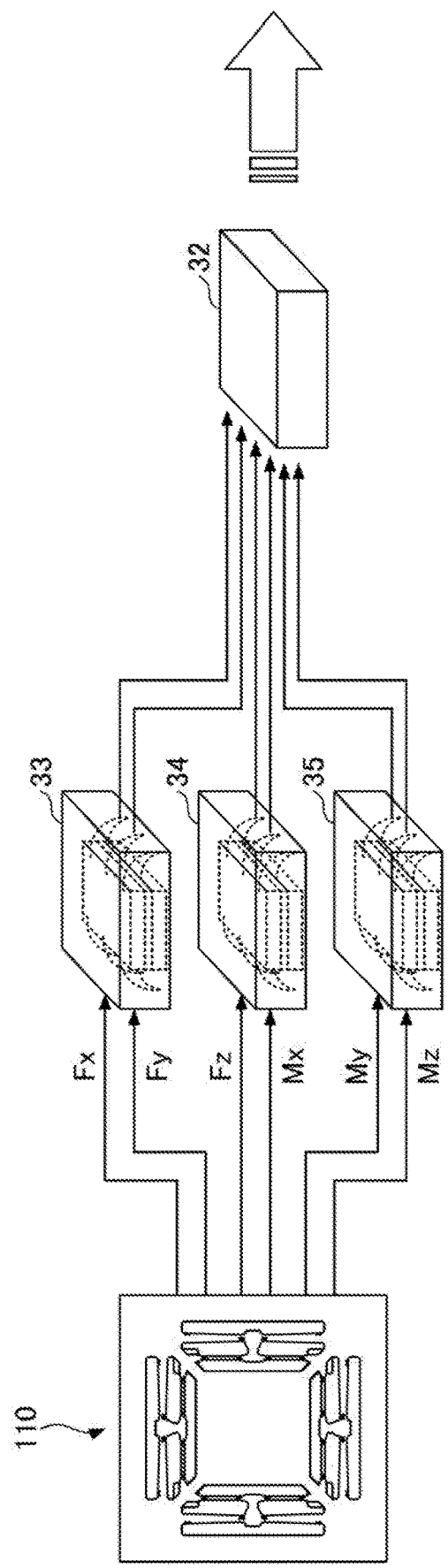

FORCE TORQUE SENSOR DEVICE INCLUDING SENSOR CHIP BONDED TO STRAIN BODY BY ADHESIVE

CROSS-REFERENCE TO RELATED APPLICATIONS

This application is based on and claims priority to Japanese Patent Application No. 2019-196242, filed Oct. 29, 2019, the entire contents of which are incorporated herein by reference.

BACKGROUND OF THE INVENTION

1. Field of the Invention

The present disclosure relates to a force torque sensor device.

2. Description of the Related Art

A sensor chip that detects displacements in predetermined axis directions has been known. Such a sensor chip is bonded to a strain body such as metal by an adhesive, and is used as a force torque sensor (see, for example, Patent Document 1).

RELATED-ART DOCUMENTS

Patent Documents

Patent Document 1: Japanese Patent No. 4011345

SUMMARY OF THE INVENTION

According to one aspect of the embodiments of the present disclosure, a force torque sensor device includes a sensor chip that detects the displacement in a predetermined axis direction, a strain body that transmits the applied force to the sensor chip, and an adhesive that bonds the sensor chip to the strain body. The Young's modulus of the adhesive is greater than or equal to 130 MPa and less than or equal to 1.5 GPa.

BRIEF DESCRIPTION OF THE DRAWINGS

FIG. 3 is a circuit block diagram for describing active components 32 to 35;

DESCRIPTION OF THE EMBODIMENTS

Figure 1A:
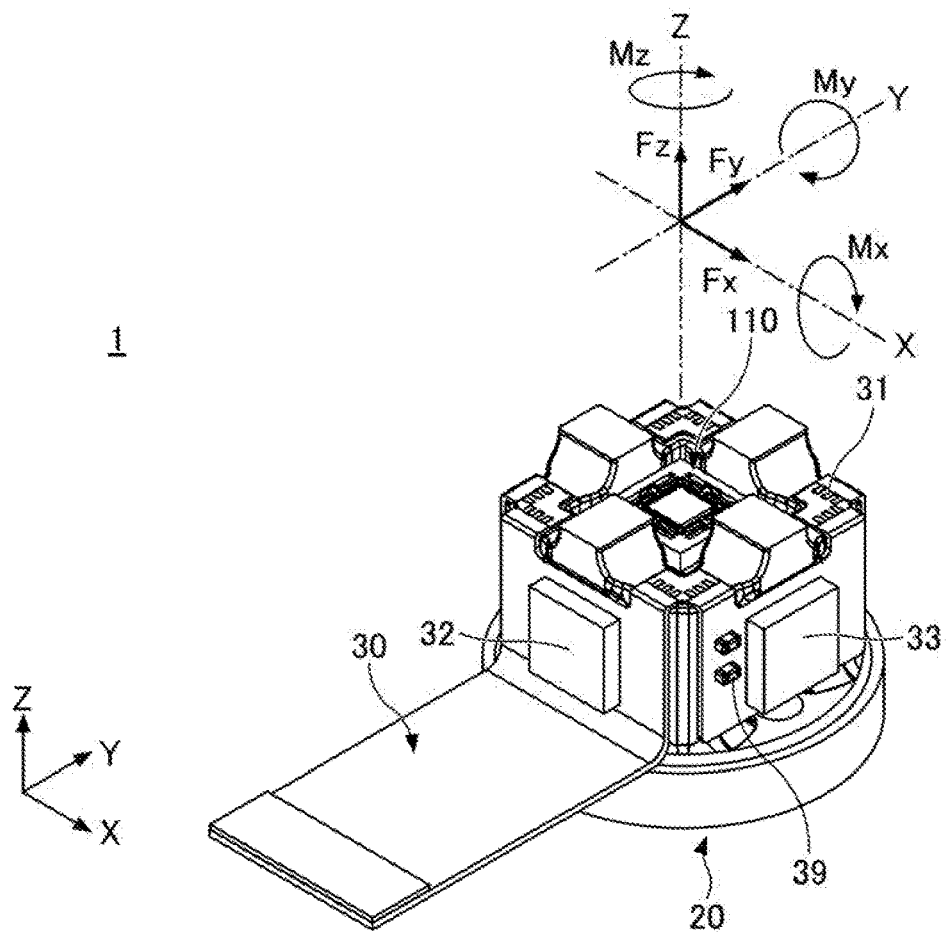
FIG. 1A and FIG. 1B are perspective views illustrating an example of a force torque sensor device according to an embodiment.

When an adhesive is used for a portion that transmits the displacement of the strain body to a force point of the sensor chip, there has been a problem in that the sensor characteristics are degraded or the connection reliability of an adhesive portion is decreased, depending on properties of the adhesive.

The present disclosure is made in view of the above-described points, and it is desirable to provide a force torque sensor device that can maintain the connection reliability of the adhesive portion while suppressing the degradation of the sensor characteristics.

With the disclosed technique, a force torque sensor device that can maintain the connection reliability of the adhesive portion while suppressing degradation of the sensor characteristics can be provided.

In the following, an embodiment for carrying out the invention will be described with reference to the drawings. In the drawings, the same components are referenced by the same reference numerals and overlapping descriptions may be omitted.

(Schematic Configuration of a Force Torque Sensor Device 1)

Figure 1B:
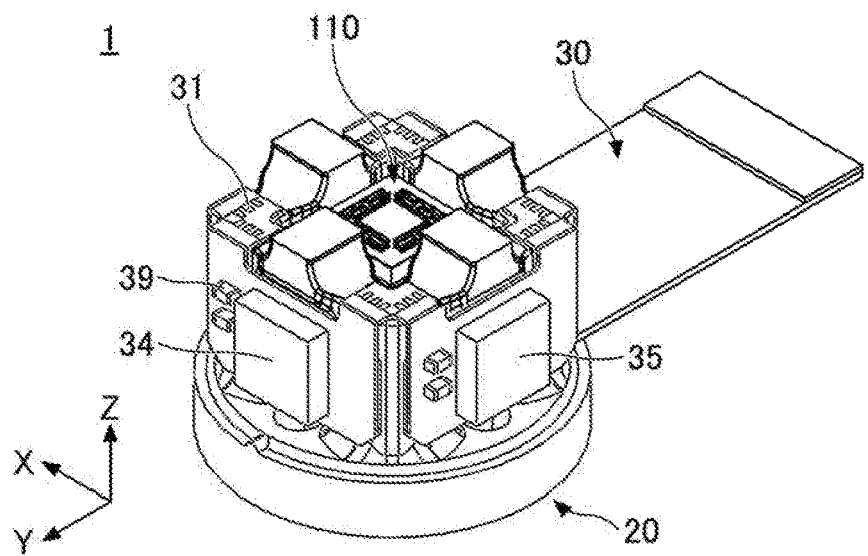
Figure 2A:
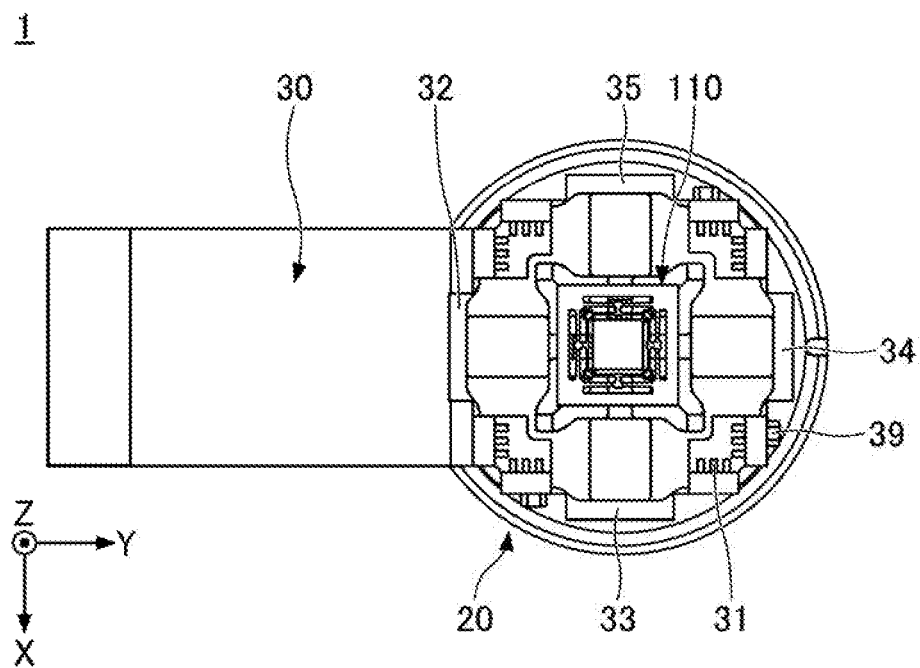
FIG. 2A and FIG. 2B are drawings illustrating an example of the force torque sensor device according to the embodiment.
Figure 2B:
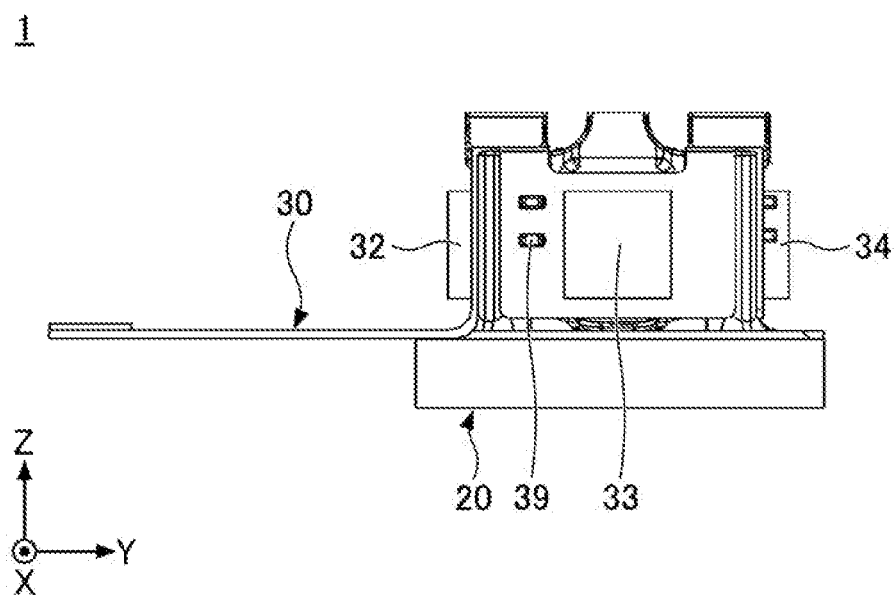

FIG. 1A and FIG. 1B are perspective views illustrating an example of a force torque sensor device according to the present embodiment. FIG. 2A and FIG. 2B are drawings illustrating an example of the force torque sensor device according to the present embodiment. FIG. 2A is a plan view, and FIG. 2B is a side view. With reference to FIGS. 1A, 1B, 2A, and 2B, a force torque sensor device 1 includes a sensor chip 110, a strain body 20, and a substrate 30. The force torque sensor device 1 is, for example, a multi-axis force torque sensor device mounted on a component such as an arm or a finger of a robot used for a machining tool.

The sensor chip 110 has a function to detect displacements in predetermined axis directions of up to six axes. As illustrated in FIGS. 1A and 1B and FIGS. 4A and 4B described later, the force in the X-axis direction is Fx, the force in the Y-axis direction is Fy, and the force in the Z-axis direction is Fz. Additionally, the moment to rotate around the X-axis is Mx, the moment to rotate around the Y-axis is My, and the moment to rotate around the 2-axis is Mz.

The strain body 20 has a function to transmit applied force to the sensor chip 110. In the following embodiment, as an example, a case in which the sensor chip 110 detects forces and moments in six axes will be described. However, the sensor chip 110 is not limited to this. For example, the sensor chip 110 may be used to detect three axes for example, by selecting axes to be detected from the forces in the X-axis direction, the Y-axis direction, the Z-axis direction, and the moments of the X-axis rotation, the Y-axis rotation, and the Z-axis rotation.

The sensor chip 110 is bonded to the upper surface of the strain body 20 such that the sensor chip 110 does not protrude from the strain body 20. Additionally, the substrate 30 is bonded to the upper surface and to each side surface of the strain body 20 in a state in which the substrate 30 is appropriately bent on one end side. The substrate 30 inputs a signal to the sensor chip 110 and outputs a signal from the sensor chip 110. The sensor chip 110 is electrically coupled to each electrode 31 of the substrate 30 by a bond wire or the like (which is not illustrated).

Active components 32 to 35 are disposed on the side surface of the strain body 20. Specifically, the active components 32 to 35 are mounted on one surface of the substrate 30 (e.g., a flexible printed circuit board) and the other surface of the substrate 30 is fixed to the side surfaces of the strain body 20. The active components 32 to 35 are electrically coupled to respective electrodes 31 through a wiring pattern (which is not illustrated) formed on the substrate 30.

More specifically, in the substrate 30, the active component 32 is mounted in an area of the substrate 30 that is disposed on a first side surface of the strain body 20. In the substrate 30, the active component 33 and a passive component 39 are mounted in an area of the substrate 30 that is disposed on a second side surface of the strain body 20. In the substrate 30, the active component 34 and a passive component 39 are mounted in an area of the substrate 30 that is disposed on a third side surface of the strain body 20. In the substrate 30, the active component 35 and a passive component 39 are mounted in an area of the substrate 30 that is disposed on a fourth side surface of the strain body 20. When preferable, the passive component 39 may be mounted to the area disposed on the first side surface of the strain body 20 in addition to the active component 32.

FIG. 3 is a circuit block diagram illustrating the active components 32 to 35. As illustrated in FIG. 3, the active component 33 is electrically coupled to the sensor chip 110, and receives, for example, an analog electrical signal from a bridge circuit that detects an X-axis direction force Fx output from the sensor chip 110 and an analog electrical signal from a bridge circuit that detects a Y-axis force Fy output from the sensor chip 110. The active component 33 may be, for example, a control IC having a function that converts the analog electrical signal output by the sensor chip 110 into a digital electrical signal, performs temperature correction, amplitude correction, or the like inside, and outputs a signal as the digital electrical signal.

The active component 34 is electrically coupled to the sensor chip 110, and receives, for example, an analog electrical signal from a bridge circuit that detects a Z-axis force Fz output from the sensor chip 110 and an analog electrical signal from a bridge circuit that detects a moment Mx output from the sensor chip 110. The moment Mx rotates around the X-axis. The active component 34 is, for example, a control IC having a function that converts the analog electrical signal output by the sensor chip 110 into a digital electrical signal, performs temperature correction, amplitude correction, or the like inside, and outputs a signal as the digital electrical signal.

The active component 35 is electrically coupled to the sensor chip 110 and receives, for example, an analog electrical signal from a bridge circuit that detects a moment My output from the sensor chip 110 and an analog electrical signal from a bridge circuit that detects a moment Mz output from the sensor chip 110. The moment My rotates around the Y-axis and the moment Mz rotates around the Z-axis. The active component 35 is, for example, a control IC having a function that converts the analog electrical signal output by the sensor chip 110 into a digital electrical signal, performs temperature correction, amplitude correction, or the like inside, and outputs a signal as the digital electrical signal.

The active component 32 is electrically coupled to the active components 33 to 35 and is, for example, an operation IC having a function that converts the forces Fx, Fy, and Fz, and the moments Mx, My, and Mz into a unit of force or moment by performing predetermined operations on digital electrical signals output from the active components 33, 34, and 35, and outputs the converted result to the outside of the active component 32. The active component 32 can, for example, output the forces Fx, Fy, and Fz in the unit of [N] and the moments Mx, My, and Mz in the unit of [N·cm]. The active component 32 may be a field programmable gate array (FPGA) or an application specific integrated circuit (ASIC), for example. The passive component 39 may be a resistor, capacitor, or the like, coupled to the active components 33 to 35.

When digitizing or both digitizing and performing correction calculations on all of the 6-axis outputs from the sensor chip 110 for example, one control IC is usually required per axis. In this case, if a mounting space of the control IC is to be provided in the force torque sensor device 1, it is necessary to prepare spaces for disposing at least six control ICs, and thus the size of the force torque sensor device 1 is required to be increased. A method of digitizing the output without enlarging the size of the force torque sensor device 1 by connecting an externally-located control substrate module, on which the control IC is mounted, is conceivable, but is not preferable because the total occupied area and volume are increased. It is also conceivable that a control IC having performance and functions for six axes is formed in one chip. However, in such a case, the size of the force torque sensor device 1 is required to be increased when the control IC is provided in the force torque sensor device 1. Nevertheless, the size is smaller than the size of the above case where six control ICs are provided.

Thus, in the present embodiment, three control ICs of a 2-in-1 package accommodated in a single package in which two chips are stack-mounted are used. Because the sizes of the single-chip package and the 2-in-1 package are not significantly different, the control ICs can be disposed on the side surfaces of the strain body 20. Thus, the control ICs for six axes can be mounted in the force torque sensor device 1 without increasing the size of the force torque sensor device 1. That is, the force torque sensor device 1 including the active components can be downsized. Also, an output signal of the sensor chip 110 can be digitalized without increasing the size of the force torque sensor device 1.

The number of ICs to be used to achieve the functions of the active components 32 to 35 may be suitably selected. The number of ICs to be mounted in the force torque sensor device 1 may be suitably selected. For example, it may be configured to mount only one control IC in the force torque sensor device 1.

The substrate 30 is bent outward below the first side surface of the strain body 20 and the other end of the substrate 30 is pulled out outward. On the other end side of the substrate 30, input/output terminals (which are not illustrated) that can perform electrical input/output with an external circuit connected to the force torque sensor device 1 (such as a control device) are arranged.

As described above, by disposing the active component (such as a control IC) on the side surface of the strain body 20, the force torque sensor device 1 is able to output a digital signal that has been adjusted or corrected by the active component while minimizing the total size of the force torque sensor device 1.

By using the control IC of the 2-in-1 package, digital output can be achieved without increasing the size of the force torque sensor device 1.

Also, because digital electrical signals are output from the substrate 30, noise resistance can be improved relative to a case in which analog electrical signals are output.

In the present embodiment, for convenience, in the force torque sensor device 1, a side on which the sensor chip 110 is provided is an upper side or one side, and the opposite side is a lower side or the other side. A surface of each portion on the side on which the sensor chip 110 is provided is one surface or an upper surface, and the opposite surface is the other surface or a lower surface. However, the force torque sensor device 1 can be used upside down or can be disposed at any angle. Planar view refers to viewing an object from the normal direction of the upper surface of the sensor chip 110 (i.e., from the Z-axis direction), and a planar shape refers a shape of an object viewed from the normal direction of the upper surface of the sensor chip 110 (i.e., from the Z-axis direction).

(Sensor Chip 110)

Figure 4A:
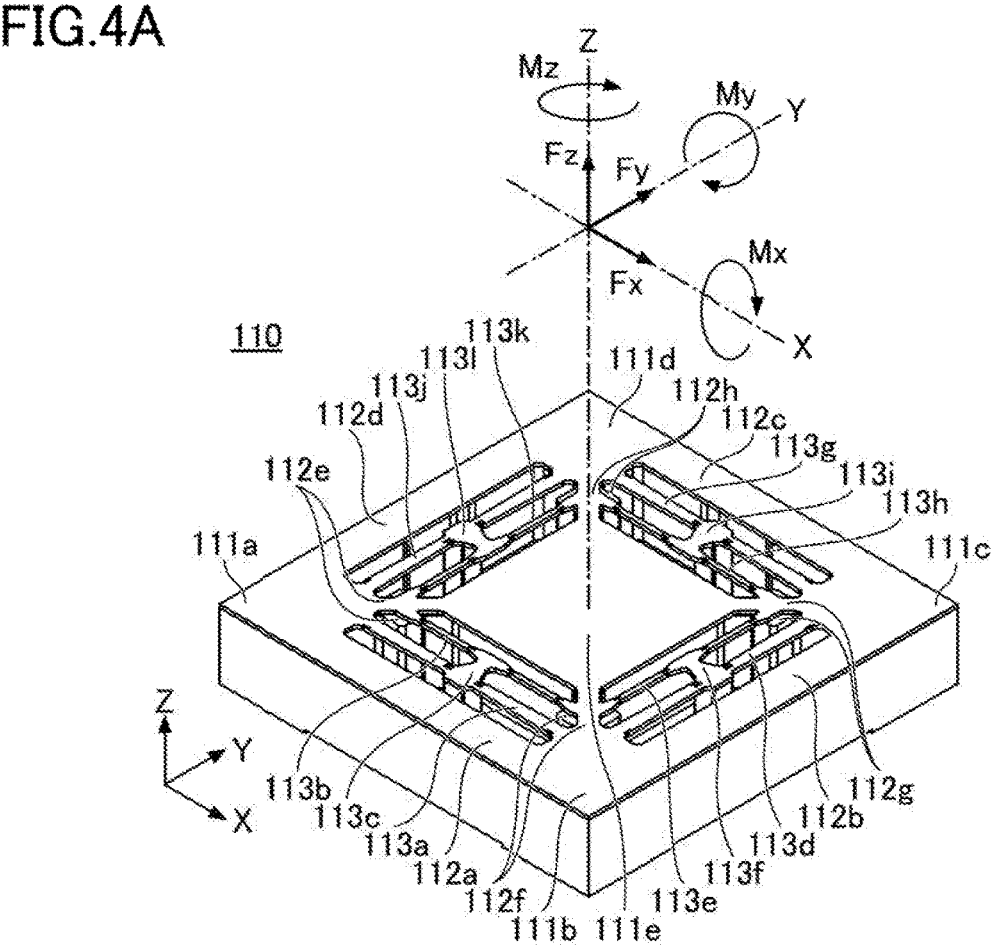
FIG. 4A and FIG. 4B are drawings of a top view of a sensor chip 110 in the Z-axis direction.
Figure 4B:
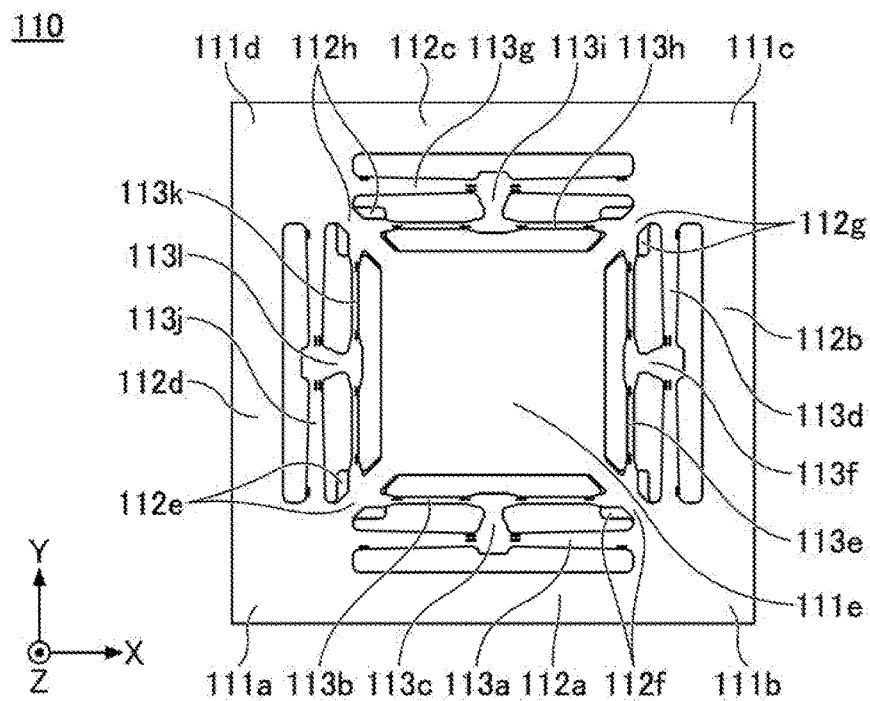
Figure 5A:
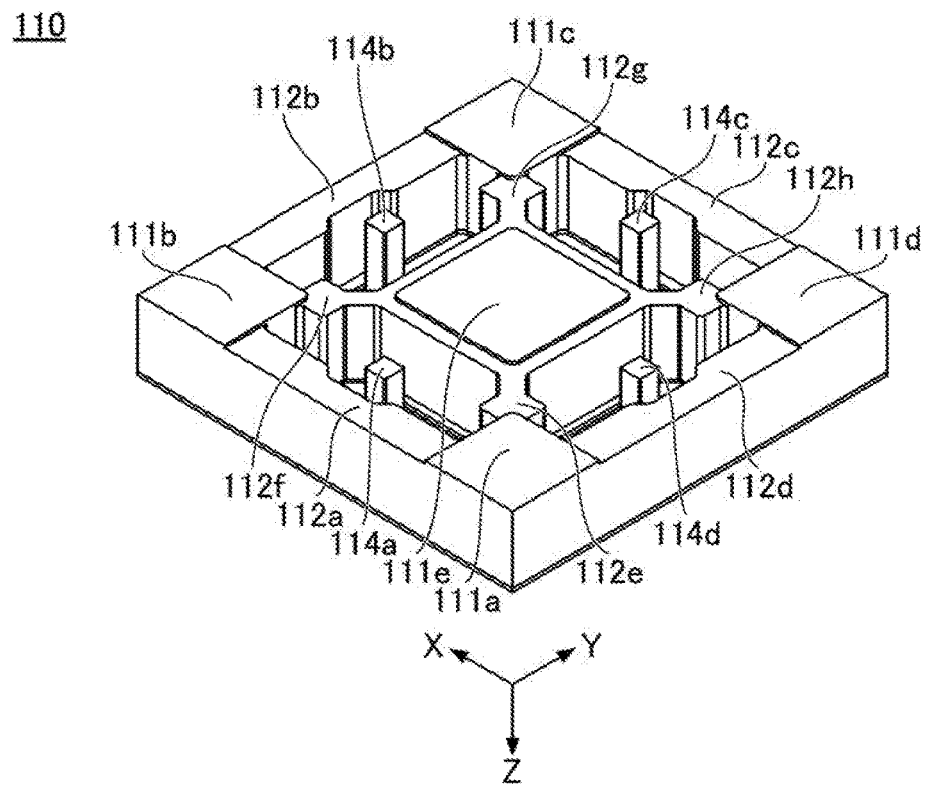
FIG. 5A and FIG. 5B are drawings of a bottom view of the sensor chip 110 in the Z-axis direction.
Figure 5B:
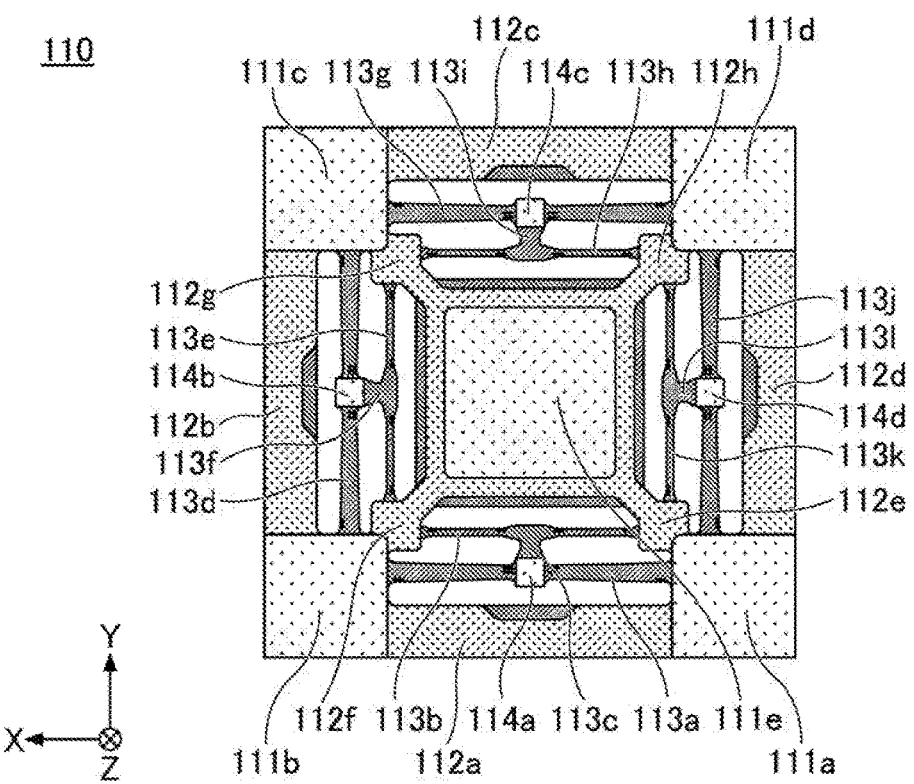

FIG. 4A and FIG. 4B are drawings of the sensor chip 110 viewed from the upper side in the Z-axis direction. FIG. 4A is a perspective view and FIG. 4B is a plan view. FIG. 5A and FIG. 5B are drawings of the sensor chip 110 viewed from the lower side in the Z-axis direction. FIG. 5A is a perspective view, and FIG. 5B is a bottom view. In FIG. 5B, for convenience, surfaces of the same height are illustrated in the same dotted pattern. The direction parallel to one side of the upper surface of the sensor chip 110 is the X-axis direction, the vertical direction is the Y-axis direction, and the thickness direction of the sensor chip 110 (i.e., the normal direction of the upper surface of the sensor chip 110) is the Z-axis direction. The X-axis direction, the Y-axis direction, and the Z-axis direction are orthogonal to one another.

The sensor chip 110 illustrated in FIGS. 4A and 4B and FIGS. 5A and 4B is a micro-electro-mechanical systems (MEMS) sensor chip that can detect up to six axes in one chip and the sensor chip 110 is formed of a semiconductor substrate, such as a silicon on insulator (SOI) substrate. The planar shape of the sensor chip 110 may be, for example, a square having each side of about 3000 μm.

The sensor chip 110 includes five columnar supports 111a to 111e. The planar shapes of the supports 111a to 111e may be, for example, a square having each side of about 500 μm. The supports 111a to 111d, which are first supports, are disposed at four corners of the sensor chip 110. The support 111e, which is a second support, is disposed at the center of the supports 111a to 111d.

The supports 111a to 111e may be formed, for example, of an active layer, a BOX layer, and a support layer of the SOI substrate, and the thickness of each of the supports 111a to 111e may be, for example, about 500 μm.

Between the support 111a and the support 111b, a reinforcing beam 112a, of which each end is fixed by the support 111a and the support 111b (i.e., the reinforcing beam 112a connects adjacent supports), is provided to reinforce the structure. Between the support 111b and the support 111c, a reinforcing beam 112b, of which each end is fixed by the support 111b and the support 111c (i.e., the reinforcing beam 112b connects adjacent supports), is provided to reinforce the structure.

Between the support 111c and the support 111d, a reinforcing beam 112c, of which each end is fixed by the support 111c and the support 111d (i.e., the reinforcing beam 112c connects adjacent supports), is provided to reinforce the structure. Between the support 111d and the support 111a, a reinforcing beam 112d, of which each end is fixed by the support 111d and the support 111a (i.e., the reinforcing beam 112d connects adjacent supports), is provided to reinforce the structure.

In other words, the four reinforcing beams 112a, 112b, 112c, and 112d, which are the first reinforcing beams, are formed as a frame, and at the corners where the respective reinforcing beams intersect, the supports 111b, 111c, 111d, and 111a are disposed.

An inner corner of the support 111a and a corner of the support 111e facing the inner corner of the support 111a are connected by a reinforcing beam 112e for reinforcing the structure. An inner corner of the support 111b and a corner of the support 111e facing the inner corner of the support 111b are connected by a reinforcing beam 112f for reinforcing the structure.

An inner corner of the support 111c and a corner of the support 111e facing the inner corner of the support 111c are connected by a reinforcing beams 112g for reinforcing the structure. An inner corner of the support 111d and a corner of the support 111e facing the inner corner of the support 111d are connected by a reinforcing beam 112h for reinforcing the structure. The reinforcing beams 112e to 112h, which are second reinforcing beams, are disposed diagonally with respect to the X-axis direction (and the Y-axis direction). That is, the reinforcing beams 112e to 112h are disposed non-parallel to the reinforcing beams 112a, 112b, 112c, and 112d.

The reinforcing beams 112a to 112h can be formed, for example, of an active layer, a BOX layer, and a support layer of the SOI substrate. The width (i.e., the width in the transverse direction) of the reinforcing beams 112a to 112h may be, for example, about 140 μm. The upper surfaces of the reinforcing beams 112a to 112h and the upper surfaces of the supports 111a to 111e are approximately flat.

With respect to this, the lower surfaces of the reinforcing beams 112a to 112h are recessed toward an upper surface side by several tens of micrometers from the lower surfaces of the supports 111a to 111e and the lower surfaces of force points 114a to 114d. This prevents the lower surfaces of the reinforcing beams 112a to 112h from contacting the surface of the strain body 20 facing the reinforcing beams 112a to 112h when the sensor chip 110 is bonded to the strain body 20.

As described above, in addition to a detecting beam for detecting distortion, the stiffness of the entire sensor chip 110 can be increased by placing a reinforcing beam that is formed to be thicker than the detecting beam for detecting distortion and that has larger stiffness. Thus, because a beam other than the detecting beam for detection is not easily deformed, good sensor characteristics can be obtained.

On the inner side from the reinforcing beam 112a between the support 111a and the support 111b, a detecting beam 113a for detecting distortion, of which each end is fixed by the support 111a and the support 111b (i.e., the detecting beam 113a connects adjacent supports), is provided parallel to the reinforcing beam 112a with a predetermined space.

Between the detecting beam 113a and the support 111e, a detecting beam 113b is provided parallel to the detecting beam 113a with predetermined spaces between the detecting beam 113b and the detecting beam 113a and between the detecting beam 113b and the support 111e. The detecting beam 113b connects an end of the reinforcing beam 112e on a support 111e side to an end of the reinforcing beam 112f on a support 111e side.

An approximately central portion of the detecting beam 113a in the longitudinal direction and an approximately central portion of the detecting beam 113b in the longitudinal direction, which faces the approximately central portion of the detecting beam 113a, are connected by a detecting beam 113c disposed orthogonal to the detecting beam 113a and the detecting beam 113b.

On the inner side from the reinforcing beam 112b between the support 111b and the support 111c, a detecting beam 113d for detecting distortion, of which each end is fixed by the support 111b and the support 111c (i.e., the detecting beam 113d connects adjacent supports), is provided parallel to the reinforcing beam 112b with a predetermined space.

Between the detecting beam 113d and the support 111e, a detecting beam 113e is provided parallel to the detecting beam 113d with predetermined spaces between the detecting beam 113e and the detecting beam 113d and between the detecting beam 113e and the support 111e. The detecting beam 113e connects an end of the reinforcing beam 112f on a support 111e side to an end of the reinforcing beam 112g on a support 111e side.

A approximately central portion of the detecting beam 113d in the longitudinal direction and an approximately central portion of the detecting beam 113e in the longitudinal direction, which faces the approximately central portion of the detecting beam 113d, are connected by a detecting beam 113f disposed orthogonal to the detecting beam 113d and the detecting beam 113e.

On the inner side from the reinforcing beam 112c between the support 111c and the support 111d, a detecting beam 113g for detecting distortion, of which each end is fixed by the support 111c and the support 111d (i.e., the detecting beam 113g connects adjacent supports), is provided parallel to the reinforcing beam 112c with a predetermined space.

Between the detecting beam 113g and the support 111e, a detecting beam 113h is provided parallel to the detecting beam 113g with predetermined spaces between the detecting beam 113h and the detecting beam 113g and between the detecting beam 113h and the support 111e. The detecting beam 113h connects an end of the reinforcing beam 112g on a support 111e side to an end of the reinforcing beam 112h on a support 111e side.

An approximately central portion of the detecting beam 113g in the longitudinal direction and an approximately central portion of the detecting beam 113h in the longitudinal direction, which faces the approximately central portion of the detecting beam 113g, are connected by a detecting beam 113i disposed orthogonal to the detecting beam 113g and the detecting beam 113h.

On the inner side from the reinforcing beam 112d between the support 111d and the support 111a, a detecting beam 113j for detecting distortion, of which each end is fixed by the support 111d and the support 111a are fixed (i.e., the detecting beam 113j connects adjacent supports), is provided parallel to the reinforcing beam 112d with a predetermined space.

Between the detecting beam 113j and the support 111e, a detecting beam 113k is provided parallel to the detecting beam 113j with predetermined spaces between the detecting beam 113k and the detecting beam 113j and between the detecting beam 113k and the support 111e. The detecting beam 113k connects an end of the reinforcing beam 112h on a support 111e side to an end of the reinforcing beam 112e on a support 111e side.

An approximately central portion of the detecting beam 113j in the longitudinal direction and an approximately central portion of the detecting beam 113k in the longitudinal direction, which faces the approximately central portion of the detecting beam 113j, are connected by a detecting beam 113l disposed orthogonal to the detecting beam 113j and the detecting beam 113k.

The detecting beams 113a to 113l are provided on an upper end side of the supports 111a to 111e in the thickness direction and can be formed, for example, of an active layer of the SOI substrate. The width (i.e., the width in the transverse direction) of the detecting beams 113a to 113l may be, for example, about 75 µm. The upper surfaces of the detecting beams 113a to 113l and the upper surfaces of the supports 111a to 111e are approximately flat. The thickness of the detecting beams 113a to 113l may be, for example, about 50 µm.

A force point 114a is provided on a lower surface side of the central portion of the detecting beam 113a in the longitudinal direction (i.e., at an intersection of the detecting beam 113a and the detecting beam 113c). The detecting beams 113a, 113b, and 113c, and the force point 114a form a detecting block.

A force point 114b is provided on a lower surface side of the central portion of the beam 113d in the longitudinal direction (i.e., at an intersection of the detecting beam 113d and the detecting beam 113f). The detecting beams 113d, 113e, and 113f and the force point 114b form a detecting block.

A force point 114c is provided on a lower surface side of the central portion of the detecting beam 113g in the longitudinal direction (i.e., at an intersection of the detecting beam 113g and the detecting beam 113i). The detecting beams 113g, 113h, and 113i and the force point 114c form a detecting block.

A force point 114d is provided on a lower surface side of the central portion of the detecting beam 113j in the longitudinal direction (i.e., an intersection of the detecting beam 113j and the detecting beam 113l). The detecting beams 113j, 113k, and 113l and the force point 114d form a detecting block.

The force points 114a to 114d are positions to which external forces are applied and can be formed of, for example, BOX layers and support layers of the SOI substrate. The lower surfaces of the force points 114a to 114d and the lower surfaces of the supports 111a to 111e are approximately flat.

Thus, a force or displacement is taken in from the four force points 114a to 114d, and different deformation of the beam is obtained for each force type, thereby achieving a sensor having a good 6-axis separation property.

In the sensor chip 110, from a viewpoint of suppressing stress concentration, it is preferable that a portion forming an inner angle is an R-shape.

Figure 6:
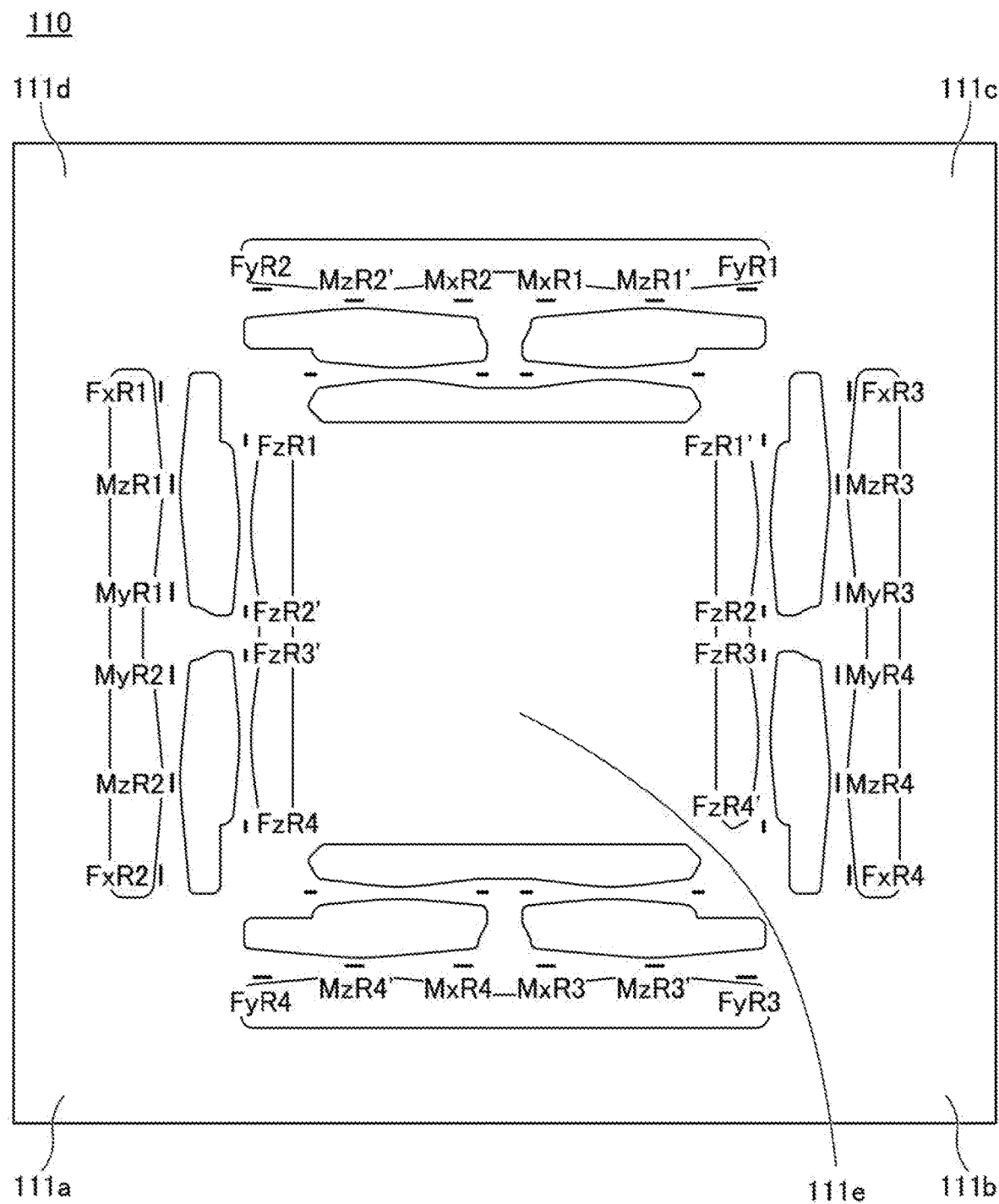
FIG. 6 is a drawing illustrating an example of an arrangement of piezoresistive elements of the sensor chip 110.

FIG. 6 illustrates an example of an arrangement of piezoresistive elements of the sensor chip 110. A piezoresistive element, which is formed of a plurality of strain detecting elements, is disposed in predetermined positions of respective detecting blocks corresponding to the four force points 114a to 114d.

Specifically, referring to FIGS. 4A, 4B, and 6, in the detecting block corresponding to the force point 114a, piezoresistive elements MxR3 and MxR4 are disposed on a line that bisects the detecting beam 113a in the longitudinal direction and at positions symmetrical with respect to a line that bisects the detecting beam 113c in the longitudinal direction (i.e., the Y direction) in regions of the detecting beam 113a close to the detecting beam 113c. Piezoresistive elements FyR3 and FyR4 are disposed on a reinforcing beam 112a side with respect to the line that bisects the detecting beam 113a in the longitudinal direction and at positions symmetrical with respect to the line that bisects the detecting beam 113c in the longitudinal direction in regions of the detecting beam 113a away from the detecting beam 113c.

The piezoresistive elements MzR3' and MzR4' are disposed on the line that bisects the detecting beam 113a in the longitudinal direction and at positions symmetrically with respect to the line that bisects the detecting beam 113c in the longitudinal direction in proximity to central positions, one central position being between a position of the detecting beam 113a connected to the support 111a and a position of the detecting beam 113a connected to the force point 114a and the other central position being between a position of the detecting beam 113a connected to the support 111b and the position of the detecting beam 113a connected to the force point 114a.

Here, in the detecting beam 113a, the width of the detecting beam 113a at positions on which the piezoresistive elements MzR3' and MzR4' are formed is narrower than the width of the detecting beam 113a at positions connected to the support 111a, the support 111b, and the force point 114a. In the detecting beam 113a, regions in which a beam width is narrowed are formed, one region being between a position connected to the support 111a and a position connected to the force point 114a and the other region being between a position connected to the support 111b and the position connected to the force point 114a. Also, the piezoresistive elements MzR3' and MzR4' are formed on the regions of the detecting beam 113a in which the beam width is narrowed.

In the detecting block corresponding to the force point 114b, piezoresistive elements MyR3 and MyR4 are disposed on a line that bisects the detecting beam 113d in the longitudinal direction and at positions symmetrical with respect to a line that bisects the detecting beam 113f in the longitudinal direction (i.e., the X direction) in regions of the detecting beam 113d close to the detecting beam 113f. Piezoresistive elements FxR3 and FxR4 are disposed on a reinforcing beam 112b side with respect to the line that bisects the detecting beam 113d in the longitudinal direction, and at positions symmetrical with respect to the line that bisects the detecting beam 113f in the longitudinal direction in regions of the detecting beam 113d away from the detecting beam 113f.

The piezoresistive elements MzR3 and MzR4 are disposed on the line that bisects the detecting beam 113d in the longitudinal direction and at positions symmetrically with respect to the line that bisects the detecting beam 113f in the longitudinal direction in proximity to central positions, one central position being between a position of the detecting beam 113d connected to the support 111b and a position of the detecting beam 113d connected to the force point 114b and the other central position being between a position of the detecting beam 113d connected to the support 111c and the position of the detecting beam 113d connected to the force point 114b.

Here, in the detecting beam 113d, the width of the detecting beam 113d at positions on which the piezoresistive elements MzR3 and MzR4 are formed is narrower than the width of the detecting beam 113d at positions connected to the support 111b, the support 111c, and the force point 114b. In the detecting beam 113d, regions in which a beam width is narrowed are formed, one region being between a position connected to the support 111b and a position connected to the force point 114b and the other region being between a position connected to the support 111c and the position connected to the force point 114b. Also, the piezoresistive elements MzR3 and MzR4 are formed on the regions of the detecting beam 113d in which the beam width is narrowed.

Piezoresistive elements FzR2 and FzR3 are disposed on a line that bisects the detecting beam 113e in the longitudinal direction and at positions symmetrical with respect to a line that bisects the detecting beam 113f in the longitudinal direction in regions of the detecting beam 113e close to the detecting beam 113f. Piezoresistive elements FzR1' and FzR4' are disposed on the line that bisects the detecting beam 113e in the longitudinal direction, and at positions symmetrical with respect to the line that bisects the detecting beam 113f in the longitudinal direction in regions of the detecting beam 113e away from the detecting beam 113f.

Here, the detecting beam 113e includes a straight portion and a flared end connected to the straight portion through a connection. The straight portion is a portion in which the beam width of the detecting beam 113e is substantially constant. The flared end is a portion provided on ends of the detecting beam 113e or a portion connected to the beam 113f, and the width of the flared end gradually increases as the distance away from the connection increases. The piezoresistive elements FzR2, FzR3, FzR1', and FzR4' are disposed on a flared end side from the connection in the detecting beam 113e of the above-described configuration.

That is, the piezoresistive elements FzR2, FzR3, FzR1', and FzR4' are disposed inside the flared end, not on the straight portion of the detecting beam 113e. With respect to the piezoresistive elements FzR1' and FzR4', portions of the piezoresistive elements FzR1' and FzR4' are formed so as to respectively overlap the reinforcing beam 112g and the reinforcing beam 112f.

In the detecting block corresponding to the force point 114c, piezoresistive elements MxR1 and MxR2 are disposed on a line that bisects the detecting beam 113g in the longitudinal direction and at positions symmetrical with respect to a line that bisects the detecting beam 113i in the longitudinal direction (i.e., the Y direction) in regions of the detecting beam 113g close to the detecting beam 113i. Piezoresistive elements FyR1 and FyR2 are disposed on a reinforcing beam 112c side with respect to the line that bisects the detecting beam 113g in the longitudinal direction and at positions symmetrical with respect to the line that bisects the detecting beam 113i in the longitudinal direction in regions of the detecting beam 113g away from the detecting beam 113i.

Piezoresistive elements MzR1' and MzR2' are disposed on the line that bisects the detecting beam 113g in the longitudinal direction and at positions symmetrical with respect to the line that bisects the detecting beam 113i in the longitudinal direction in proximity to central positions, one central position being between a position of the detecting beam 113g connected to the support 111c and a position of the detecting beam 113g connected to the force point 114c and the other central position being between a position of the detecting beam 113g connected to the support 111d and a position of the detecting beam 113g connected to the force point 114c.

Here, in the detecting beam 113g, the width of the detecting beam 113g at positions on which the piezoresistive element MzR1' and MzR2' are formed is narrower than the width of the detecting beam 113g at positions connected to the support 111c, the support 111d, and the force point 114c.

That is, in the detecting beam 113g, regions in which the beam width is narrowed are formed, one region being between a position connected to the support 111*c* and a position connected to the force point 114*c* and the other region being between a position connected to the support 111*d* and a position connected to the force point 114*c*. Also, piezoresistive elements MzR1' and MzR2' are formed on the regions of the detecting beam 113*g* in which the beam width is narrowed.

In the detecting block corresponding to the force point 114*d*, piezoresistive elements MyR1 and MyR2 are disposed on a line that bisects the detecting beam 113*j* in the longitudinal direction and at positions symmetrical with respect to a line that bisects the detecting beam 113*l* in the longitudinal direction (i.e., the X direction) in regions of the detecting beam 113*j* close to the detecting beam 113*l*. Piezoresistive elements FxR1 and FxR2 are disposed on a reinforcing beam 112*d* side with respect to the line that bisects the detecting beam 113*j* in the longitudinal direction and at positions symmetrical with respect to a line that bisects the beam 113*l* in the longitudinal direction in regions of the detecting beam 113*j* away from the detecting beam 113*l*.

Piezoresistive elements MzR1 and MzR2 are disposed on the line that bisects the detecting beam 113*j* in the longitudinal direction and at positions symmetrical with respect to the line that bisects the detecting beam 113*l* in the longitudinal direction in the proximity to central positions, one central position being between a position of the detecting beam 113*j* connected to the supports 111*d* and a position of the detecting beam 113*j* connected to the force point 114*d* and the other position being between a position of the detecting beam 113*j* connected to the supports 111*a* of the detecting beam 113*j* and a position of the detecting beam 113*j* connected to the force point 114*d*.

Here, in the detecting beam 113*j*, the width of the detecting beam 113*j* at positions on which the piezoresistive element MzR1 and MzR2 are formed is narrower than the width of the detecting beam 113*j* at positions connected to the support 111*d*, the support 111*a*, and the force point 114*d*.

That is, in the detecting beam 113*j*, regions in which a beam width is narrowed are formed, one region being between a position connected to the support 111*d* and a position connected to the force point 114*d* and the other region being between a position connected to the support 111*a* and a position connected to the force point 114*d*. Also, the piezoresistive elements MzR1 and MzR2 are formed on the regions of the detecting beam 113*j* in which the beam width is narrowed.

The piezoresistive elements FzR1 and FzR4 are disposed on a line that bisects the detecting beam 113*k* in the longitudinal direction and at positions symmetrical with respect to a line that bisects the detecting beam 113*l* in the longitudinal direction in regions of the detecting beam 113*k* away from the detecting beam 113*l*. The piezoresistive elements FzR2' and FzR3' are disposed on the line that bisects the detecting beam 113*k* in the longitudinal direction and at positions symmetrical with respect to the line that bisects the detecting beam 113*l* in the longitudinal direction in regions of the detecting beam 113*k* close to the detecting beam 113*l*.

Here, the detecting beam 113*k* includes a straight portion and a flared end connected to the straight portion through a connection. The straight portion is a portion in which the beam width of the detecting beam 113*k* is substantially constant. The flared end is a portion provided on ends of the detecting beam 113*k* and a portion connected to the detecting beam 113*l*, and the width of the flared end gradually increases as the distance away from the connection increases. The piezoresistive elements FzR1, FzR4, FzR2', and FzR3' are disposed on a flared end side from the connection in the detecting beam 113*k* of the above-described configuration.

That is, the piezoresistive elements FzR1, FzR4, FzR2', and FzR3' are disposed inside the flared end, not on the straight portion of the detecting beam 113*k*. With respect to the piezoresistive elements FzR1 and FzR4, portions of the piezoresistive elements FzR1 and FzR4 are formed so as to respectively overlap with the reinforcing beam 112*h* and the reinforcing beam 112*e*.

As described above, in the sensor chip 110, multiple piezoresistive elements are separately disposed in each detecting block. This enables the sensor chip 110 to detect displacements in predetermined axis directions of up to six axes based on changes in outputs of multiple piezoresistive elements disposed in predetermined beams in accordance with directions (i.e., the axial directions) of forces applied (or transmitted) to the force points 114*a* to 114*d*.

The sensor chip 110 is structured so that the detecting beams 113*c*, 113*f*, 113*i*, and 113*l* are minimized lengthwise to position the detecting beams 113*b*, 113*e*, 113*h*, and 113*k* closer to the detecting beams 113*a*, 113*d*, 113*g*, and 113*j* and to keep the lengths of the detecting beams 113*b*, 113*e*, 113*h*, and 113*k* as long as can be provided. This structure enables the detecting beams 113*b*, 113*e*, 113*h*, and 113*k* to be easily bent like a bow, thereby relieving stress concentration and improving the load capacity.

In the sensor chip 110, piezoresistive elements are not disposed in the detecting beams 113*c*, 113*f*, 113*i*, and 113*l*. Instead, piezoresistive elements are disposed in the proximity to positions where stresses of the detecting beams 113*a*, 113*d*, 113*g*, and 113*j*, as well as the detecting beams 113*b*, 113*e*, 113*h*, and 113*k*, which are thinner, and longer than the detecting beams 113*c*, 113*f*, 113*i*, and 113*l* and which are easily bent, are the greatest. As a result, the sensor chip 110 can efficiently capture stress and improve the sensitivity (i.e., changes in the resistance of the piezoresistive element, relative to the same amount of stress, are more readily detected).

In the sensor chip 110, dummy piezoresistive elements are disposed in addition to the piezoresistive elements used to detect distortion. The dummy piezoresistive elements are disposed such that all piezoresistive elements including the piezoresistive elements used to detect distortion are point symmetrical with respect to the center of the support 111*e*.

Here, the piezoresistive elements FxR1 to FxR4 detect force Fx, the piezoresistive elements FyR1 to FyR4 detect force Fy, and the piezoresistive elements FzR1 to FzR4, and FzR1' to FzR4' detect force Fz. The piezoresistive elements MxR1 to MxR4 detect moment Mx, the piezoresistive elements MyR1 MyR4 detect moment My, and the piezoresistive elements MzR1 to MzR4, and MzR1' to MzR4' detect moment Mz. In the present embodiment, the piezoresistive elements FzR1' to FzR4' may be used as dummies, and the piezoresistive elements FzR1-FzR4 may detect the force Fz. Additionally, the piezoresistive elements MzR1' to MzR4' may be used as dummies, and the piezoresistive elements MzR1 to MzR4 may detect the moment Mz.

As described above, in the sensor chip 110, multiple piezoresistive elements are separately disposed in each detecting block. This enables the sensor chip 110 to detect displacements in predetermined axis directions of up to six axes based on changes in outputs of multiple piezoresistive elements disposed in predetermined beams in accordance with directions (i.e., the axial directions) of forces or displacements applied (or transmitted) to the force points 114a to 114d.

Specifically, in the sensor chip 110, a displacement in the Z-axis direction (i.e., Mx, My, and Fz) can be detected based on deformation of predetermined detecting beams. That is, moments in the X-axis direction and the Y-axis direction (i.e., Mx and My) can be detected based on deformation of the detecting beams 113a, 113d, 113g, and 113j, which are the first detecting beams. A force in the Z-axis direction (i.e., Fz) can be detected based on deformation of the detecting beams 113e and 113k, which are the second detecting beams.

In the sensor chip 110, displacements in the X-axis and Y-axis (i.e., Fx, Fy, and Mz) can be detected based on deformation of predetermined detecting beams. That is, forces in the X-axis direction and the Y-axis direction (i.e., Fx and Fy) can be detected based on the deformation of the detecting beams 113a, 113d, 113g, and 113j, which are the first detecting beams. The moment in the Z-axis direction (i.e., Mz) can be detected based on the deformation of the detecting beams 113a, 113d, 113g, and 113j, which are the first detecting beams.

In the sensor chip of the present embodiment described above, the detecting beam 113e includes a straight line portion and a flared end connected to the straight line portion through a connection, and the piezoresistive elements FzR2, FzR3, FzR1', and FzR4' are disposed on a flared end side from the connection in the detecting beam 113e of the above-described configuration. The detecting beam 113k includes a straight line portion and a flared end connected to the straight line portion through a connection, and the piezoresistive elements FzR1, FzR4, FzR2', and FzR3' are disposed on a flared end side from the connection in the detecting beam 113k of the above-described configuration.

The thickness and width of each detecting beam can be changed so as to adjust each detecting beam for obtaining uniform detection sensitivity and improving the detection sensitivity.

The number of piezoresistive elements can be reduced to provide a sensor chip for detecting displacements in predetermined axis directions less than six axes.

According to the sensor chip of the above-described embodiment, by providing slopes at roots of the beam, deformation of the beam caused when a force is applied changes, thereby newly creating a position where a stress can be detected. This can control stress generating positions. In addition, by detecting stresses generated at different positions of the beam (i.e., distant positions of the beam) depending on input types by using the piezoresistive elements, axis separation with smaller interference can be achieved, and the stresses with respect to multiple inputs can be detected with high accuracy. In the sensor chip according to the present embodiment, a large effect on axis separation between Fx and Fz and axis separation between Fx, Mx, and My can be obtained in particular. Additionally, multiple types of forces and torques can be accurately detected in a single beam without increasing the number of the beams or force points, thereby reducing the size of the sensor chip. By providing slopes at roots of the beam, the stiffness of the beam can be increased and the load capacity can be improved.

(Strain Body 20)

Figure 7A:
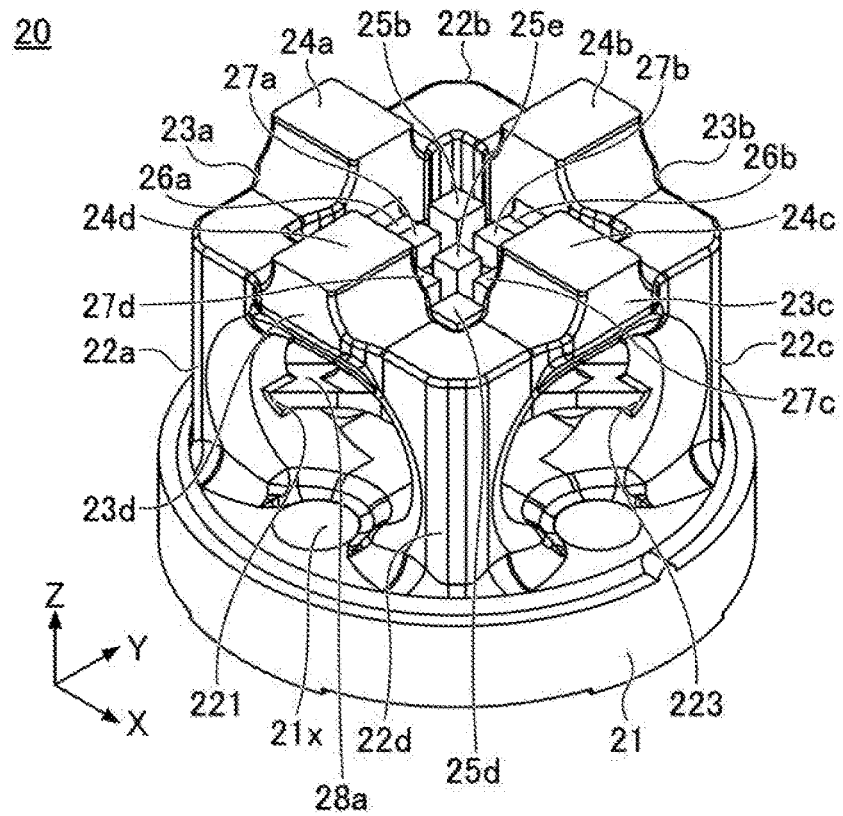
FIG. 7A and FIG. 7B are first drawings illustrating an example of a strain body 20.
Figure 7B:
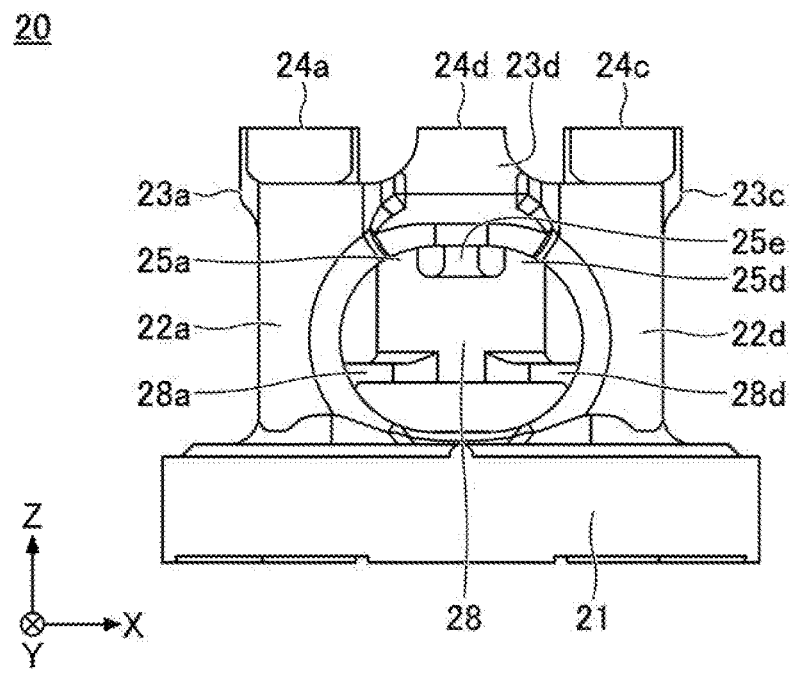
Figure 8A:
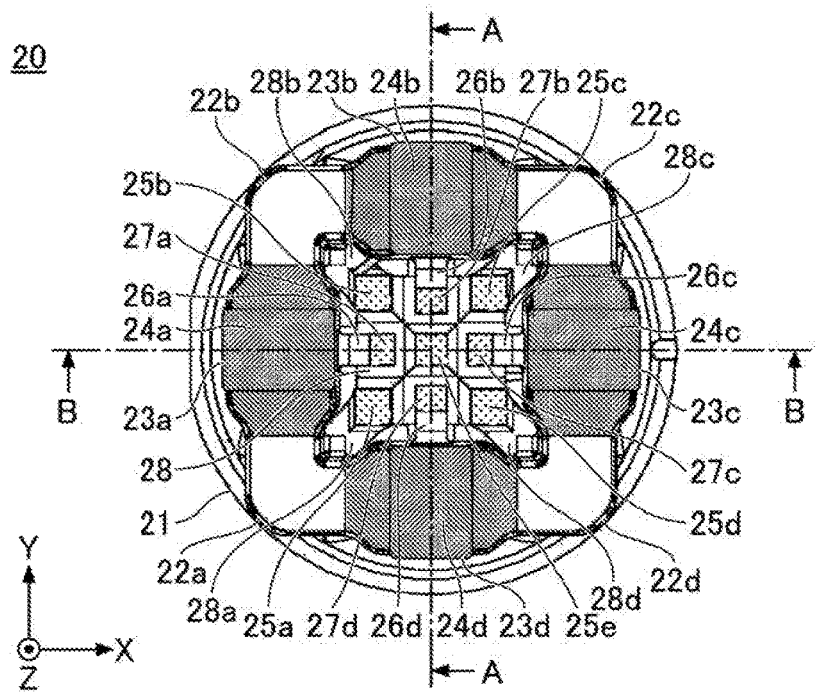
FIG. 8A and FIG. 8B are second drawings illustrating an example of the strain body 20.
Figure 8B:
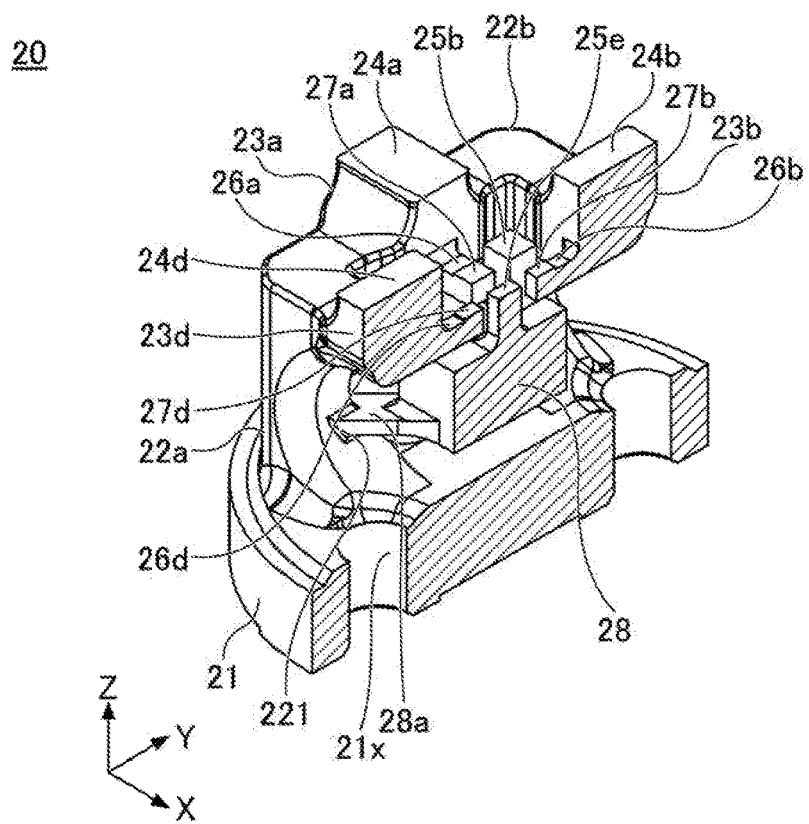
Figure 9A:
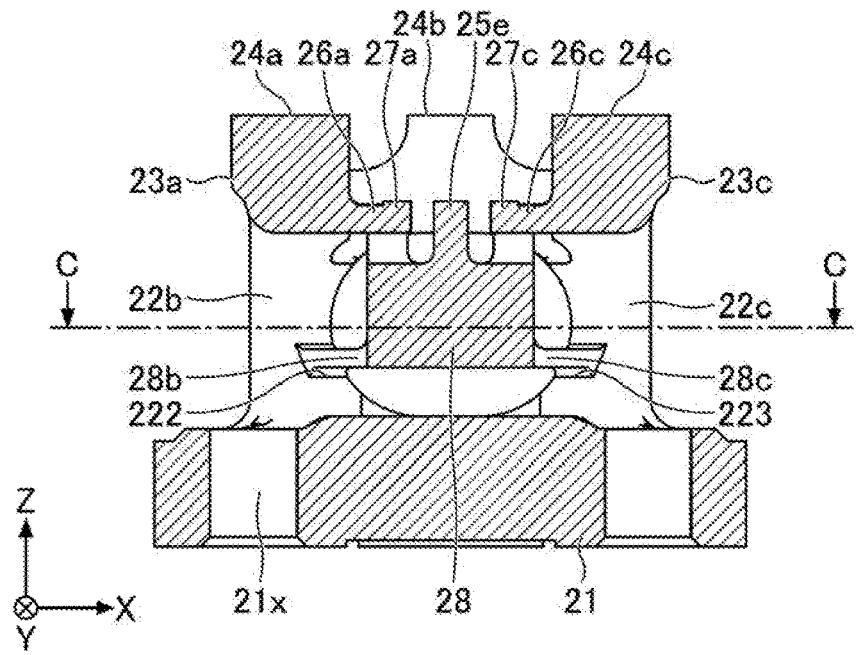
FIG. 9A and FIG. 9B are third drawings illustrating an example of the strain body 20.
Figure 9B:
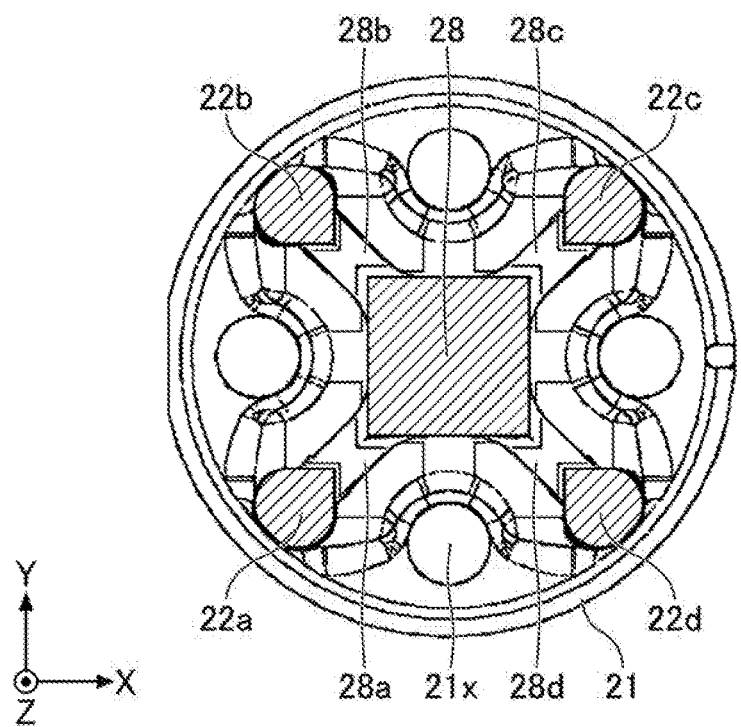
Figure 10:
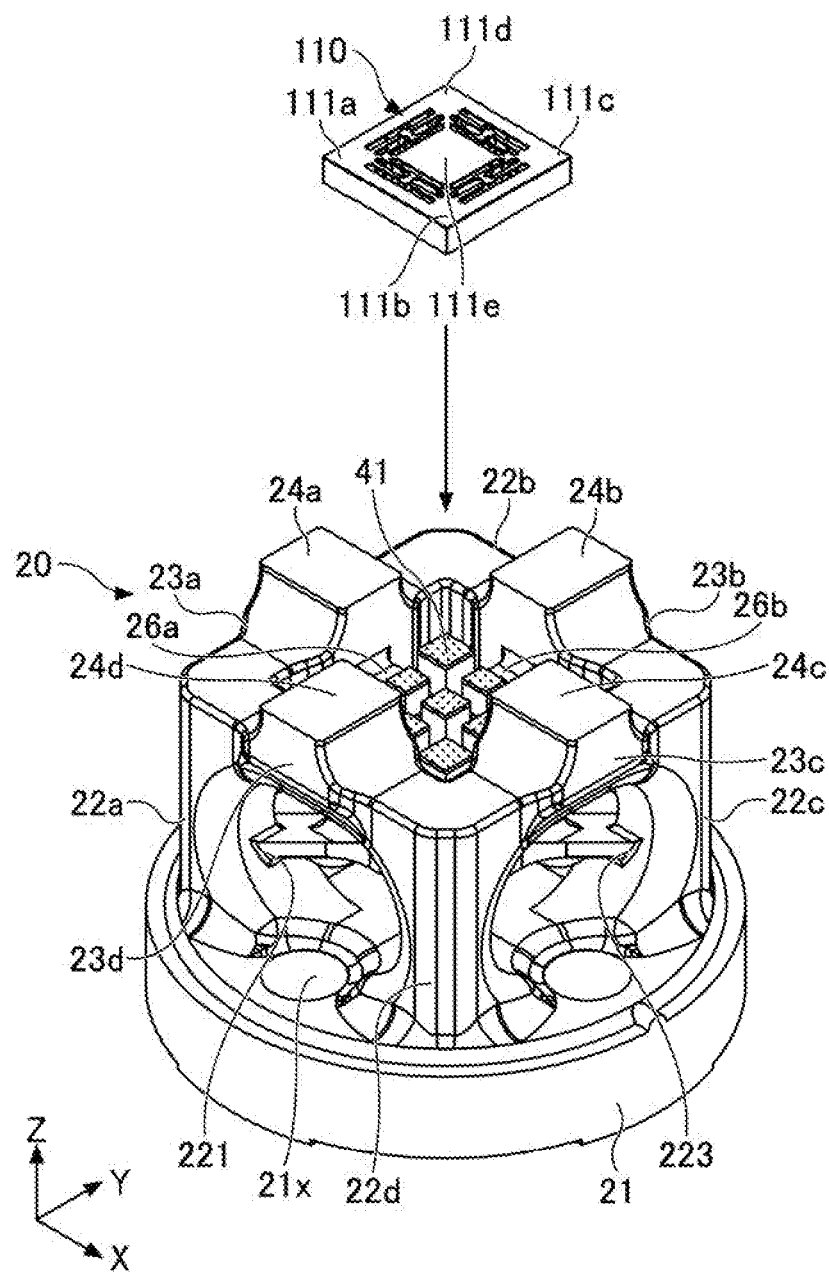
FIG. 10 is a first drawing illustrating an example of a manufacturing process of a force torque sensor device 1.

FIG. 7A and FIG. 7B are first drawings illustrating an example of the strain body 20. FIG. 7A is a perspective view and FIG. 7B is a side view. FIG. BA and FIG. 8B are second drawings illustrating an example of the strain body 20. FIG. 8A is a plan view and FIG. 8B is a perspective view of a vertical section along the A-A line of FIG. 8A. In FIG. 8A, for convenience, surfaces of the same height are illustrated in the same dotted pattern. FIG. 9A and FIG. 9B are third drawings illustrating an example of the strain body 20. FIG. 9A is a vertical cross-sectional view along the B-B line of FIG. 8A and FIG. 9B is a cross-sectional view along the C-C line of FIG. 9A.

As illustrated in FIGS. 7 to 9, the strain body 20 includes a base 21 that is mounted directly to a fixing portion, a column 28 that is a sensor chip mounting portion on which the sensor chip 110 is mounted, and columns 22a to 22d disposed apart from one another around the column 28.

More specifically, with respect to the strain body 20, the four columns 22a to 22d are disposed on the upper surface of the base 21 formed in a substantially circular shape so as to be point symmetrical to the center of the base 21, and beams 23a to 23d are provided as a frame to connect adjacent columns on a side opposite to the base 21. Then, the column 28 is disposed over the center of the upper surface of the base 21. The planar shape of the base 21 is not limited to a circular shape, but may be, for example, a polygonal shape (e.g., a square).

The column 28 is formed to be thicker and shorter than the columns 22a to 22d. The sensor chip 110 is fixed on the column 28 such that the sensor chip 110 does not protrude above the upper surface of the columns 22a to 22d.

The column 28 is not fixed directly to the upper surface of the base 21, but is fixed to the columns 22a to 22d through connecting beams 28a to 28d. Thus, there is space between the upper surface of the base 21 and the lower surface of the column 28. The lower surface of the column 28 and the lower surface of each of the connecting beams 28a to 28d may be flat.

The cross-sectional shape of portions of the column 28 to which the connecting beams 28a to 28d are connected is, for example, a rectangular shape, and four corners of the rectangular shape and the columns 22a to 22d facing the four corners of the rectangular shape are connected through the connecting beams 28a to 28d. Preferably, positions 221 to 224 where the connecting beams 28a to 28d are connected to the columns 22a to 22d are on a lower side of middle positions of the columns 22a to 22d in the height direction. The reason for this will be described later. The cross-sectional shape of portions to which the connecting beams 28a to 28d of the column 28 are connected is not limited to a rectangular shape, but may be, for example, a circular shape or a polygonal shape (e.g., a hexagon shape).

The connecting beams 28a to 28d are disposed substantially parallel to the upper surface of the base 21 with a predetermined space so as to be point symmetrical to the center of the base 21. The thickness (or stiffness) of the connecting beams 28a to 28d is preferably formed to be thinner than the thickness of the columns 22a to 22d and the beams 23a to 23d, or the stiffness of the connecting beams 28a to 28d is preferably formed to be smaller than the stiffness of the columns 22a to 22d and the beams 23a to 23d, in order not to interfere with the deformation of the strain body 20.

As described, the upper surface of the base 21 and the lower surface of the column 28 are separated by a predetermined distance. The predetermined distance may be, for example, about several millimeters. In a case of a structure of fixing the column 28 to the columns 22a to 22d through the connecting beams 28a to 28d without fixing the column 28 directly to the upper surface of the base 21, as the distance between the upper surface of the base 21 and the lower surface of the column 28 increases, the deformation of the column 28 caused when screws are tightened reduces, thereby reducing an Fz output (offset) of the sensor chip 110. With respect to this, as the distance between the upper surface of the base 21 and the lower surface of the column 28 increases, the output of the sensor chip 110 decreases (i.e., the sensitivity is reduced).

That is, the column 28 is preferably connected on the lower side of middle positions of the columns 22a to 22d. This can reduce the Fz output (offset) of the sensor chip 110 when screws are tightened while maintaining the sensitivity of the sensor chip 110.

If the decrease of the Fz output (offset) of the sensor chip 110 when screws were tightened was to be achieved by increasing the stiffness of the base 21, the thickness of the base 21 would be required to be thick and the overall size of the force torque sensor device would increase. By using a structure in which the column 28 is fixed to the columns 22a to 22d through the connecting beams 28a to 28d without fixing the column 28 directly to the upper surface of the base 21, the Fz output (offset) of the sensor chip 110 caused when screws are tightened can be reduced without increasing the overall size of the force torque sensor device.

By fixing the column 28 to the columns 22a to 22d through the connecting beams 28a to 28d without fixing the column 28 directly to the upper surface of the base 21, the separation of moment components Mx and My and force components in the translation direction Fx and Fy when the moments Mx and My are input can be improved.

In the base 21, a through-hole 21x is provided to fix the strain body 20 to the fixing portion by using screws or the like. In the present embodiment, four through-holes 21x are provided in the base 21, but the number of through-holes 21x can be suitably determined.

The outline shape of the strain body 20 excluding the base 21 may be a cuboid, which is, for example, about 5000 μm in length, about 5000 μm in width, and about 7000 μm in height. A cross-sectional shape of the columns 22a to 22d may be, for example, a square having about 1000 μm of each side. A cross-sectional shape of the column 28 may be, for example, a square having about 2000 μm of each side.

In order to suppress the concentration of stress in the strain body 20, it is preferable that a portion forming an inner angle is an R-shape. For example, the surfaces of the columns 22a to 22d on a center side of the upper surface of the base 21 are preferably formed in an R-shape. Similarly, the surfaces of the beams 23a to 23d facing the upper surface of the base 21 are preferably formed in an R-shape on the right and left sides.

As the radius of curvature of the R-shaped portion increases, the effect of suppressing stress concentration increases. However, if the radius of curvature of the R-shaped portion increased too much, the strain body 20 would be larger, and as a result, the force torque sensor device 1 would be larger. Therefore, there is a limit to increasing the radius of curvature of the R-shaped portion.

In the present embodiment, as illustrated in a dense dotted pattern in FIG. 8A, central portions of the beams 23a to 23d in the longitudinal direction, in which excessive stress concentration is caused when Mx, My, and Mz are applied to the force torque sensor device 1, are thicker than the ends. The central portions of the beams 23a to 23d in the longitudinal direction have protrusions extending inward and outward from the side surfaces of the columns 22a to 22d.

This increases the cross-sectional areas of the central portions of the beams 23a to 23d in the longitudinal direction. Therefore, the stresses generated in the central portions of the beams 23a to 23d in the longitudinal direction when the Mx, My, and Mz are applied to the force torque sensor device 1, which are originally concentrated, can be reduced. That is, the stress concentration on the central portions of the beams 23a to 23d in the longitudinal direction can be reduced.

The side surfaces of the central portions of the beams 23a to 23d in the longitudinal direction extend outward from the side surfaces of the columns 22a to 22d to provide extending portions, so that extra spaces are created on the four side surfaces of the strain body 20. Thus, at least a portion of each of the active components 32 to 35 can be included in the extra space, thereby efficiently disposing the active components 32 to 35 on the side surfaces of the strain body 20 (see FIGS. 1, 2, and other drawings).

The active components 32 to 35 may be disposed such that at least the portion of each of the active components 32 to 35 overlaps the extending portion in a plan view, for example, on the side surfaces of the strain body 20 on a base 21 side from the beams 23a to 23d (see FIGS. 2A, 2B, and other drawings).

On central portions of the upper surfaces of the beams 23a to 23d in the longitudinal direction, protrusions protruding upward from central portions of the beams 23a to 23d in the longitudinal direction are respectively provided, and on the protrusions, inputs 24a to 24d are provided. The inputs 24a to 24d are square columns, for example. The inputs 24a to 24d are portions to which forces are externally applied, and when forces are applied to the inputs 24a to 24d, the beams 23a to 23d and the columns 22a to 22d are deformed in accordance with the forces.

Thus, by providing the four inputs 24a to 24d, the load capacities of the beams 23a to 23d can be improved relative to, for example, a structure of one input.

Four columns 25a to 25d are disposed on the four corners of the upper surface of the column 28, and a column 25e, which is a fourth column, is disposed at the center of the upper surface of the column 28. The columns 25a to 25e are formed to have the same height.

That is, the upper surfaces of the columns 25a to 25e are disposed in the same plane. The upper surfaces of the columns 25a to 25e are junctions bonded to the lower surface of the sensor chip 110.

On central portions of inner surfaces of the beams 23a to 23d in the longitudinal direction, beams 26a to 26d respectively protruding horizontally inward from the inner surfaces of the beams 23a to 23d are provided. The beams 26a to 26d are beams that transmit deformation of the beams 23a to 23d and the columns 22a to 22d to the sensor chip 110. At front end sides of the beams 26a to 26d, protrusions 27a to 27d respectively protruding upward from the front end sides of the upper surfaces of the beams 26a to 26d are provided.

The protrusions 27a to 27d are formed to have the same height. That is, the upper surfaces of the protrusions 27a to 27d are disposed in the same plane. The upper surfaces of the protrusions 27a to 27d are junctions bonded to the lower surface of the sensor chip 110. The beams 26a to 26d and the protrusions 27a to 27d are connected to the beams 23a to 23d, which are movable, and when forces are applied to the inputs 24a to 24d, the beams 26a to 26d and the protrusions 27a to 27d are deformed in accordance with the forces.

When no force is applied to the inputs 24a to 24d, the upper surfaces of the columns 25a to 25e and the upper surfaces of the protrusions 27a to 27d are positioned in the same plane.

In the strain body 20, the base 21, columns 22a to 22d, the column 28, the beams 23a to 23d, the inputs 24a to 24d, the columns 25a to 25e, the beams 26a to 26d, and the protrusions 27a to 27d are preferably seamlessly formed from a viewpoint of maintaining stiffness and precision fabrication. For example, a hard metallic material such as stainless steel (SUS) may be used as a material of the strain body 20. Among SUS, it is preferable to use SUS 630, which is particularly hard and of high mechanical strength.

Thus, similarly with the sensor chip 110, the strain body 20 is structured to have columns and beams, so that different deformation in the six axes is caused by applied forces, thereby transmitting the deformation of the six axes with improved separation to the sensor chip 110.

That is, the forces applied to the inputs 24a to 24d of the strain body 20 are transmitted to the sensor chip 110 through the columns 22a to 22d, the beams 23a to 23d, and the beams 26a to 26d, and displacements are detected by the sensor chip 110. Then, in the sensor chip 110, the output of each axis can be obtained from a bridge circuit formed for each axis.

(Process of Manufacturing the Force Torque Sensor Device 1)

FIGS. 10 to 13 are drawings illustrating an example of a process of manufacturing the force torque sensor device 1. First, in the process illustrated in FIG. 10, an adhesive 41 is applied to the upper surfaces of the columns 25a to 25e of the strain body 20 and the upper surfaces of the protrusions 27a to 27d. The sensor chip 110 is then positioned in the strain body 20 while being pressurized so that the lower surface of the sensor chip 110 comes in contact with the adhesive 41 applied to the upper surfaces of the columns 25a to 25e and the upper surfaces of the protrusions 27a to 27d. The adhesive 41 is heated to a predetermined temperature to be hardened. This fixes the sensor chip 110 in the strain body 20. Specifically, the supports 111a to 111d of the sensor chip 110 are respectively fixed to the columns 25a to 25e, the support 111e is fixed to the columns 25e, and the force points 114a to 114d are respectively fixed to the protrusions 27a to 27d.

The strain body 20 can be seamlessly formed, for example, by molding, cutting, or wire discharge. A hard metallic material, such as SUS, may be used as a material of the strain body 20, for example. Among SUS, it is preferable to use SUS 630, which is hard and of high mechanical strength in particular. When the strain body 20 is manufactured by molding, for example, metal particles and a resin to be a binder are molded in a metal mold, and then the resin is sintered to vaporize the resin, thereby manufacturing the strain body 20 made of metal.

An adhesive, such as a modified silicone, may be used as the adhesive 41, for example. Preferably, the Young's modulus of the adhesive 41 is greater than or equal to 130 MPa and less than or equal to 1.5 GPa, and the thickness of the adhesive 41 is greater than or equal to 10 μm and less than or equal to 40 μm.

The sensor chip 110 can be manufactured, for example, by a well-known method of preparing a SOI substrate and etching the prepared substrate (e.g., reactive ion etching). Electrodes and wiring can be made by, for example, patterning a metal film by photolithography after a metal film, such as aluminum, is formed on a surface of the substrate by a sputtering method or the like.

Figure 11:
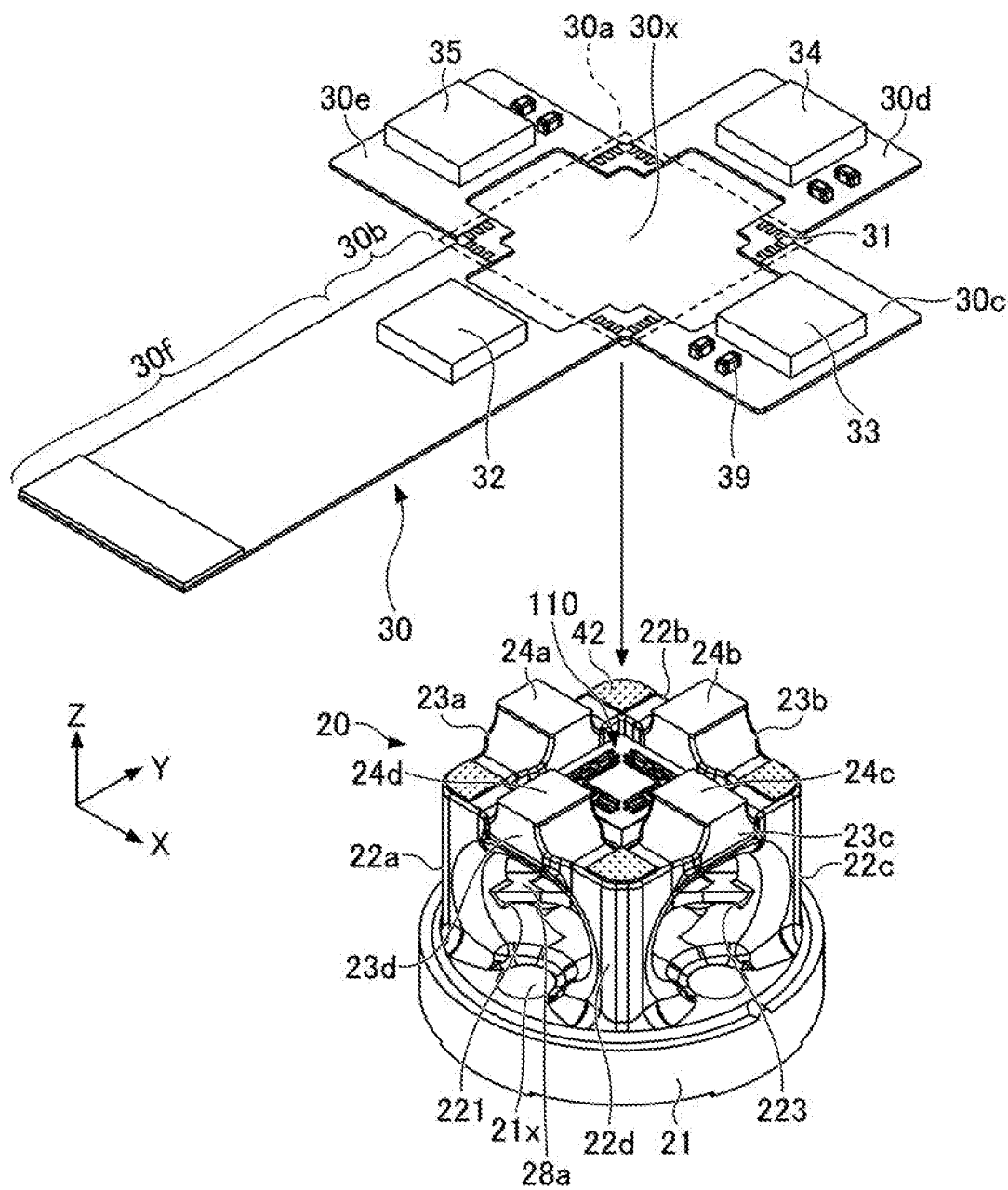
FIG. 11 is a second drawing illustrating an example of the manufacturing process of the force torque sensor device 1.

Next, in the process illustrated in FIG. 11, the substrate 30 includes an end face fixing portion 30a on which the active components 32 to 35 and the passive components 39 are mounted. The end face fixing portion 30a is fixed to the upper surfaces (i.e., the end faces) of the columns 22a to 22d. In FIG. 11, the cross-crossing area is the end face fixing portion 30a. The electrodes 31 (i.e., bonding pads) are provided at four corners of the end face fixing portion 30a.

Figure 13A:
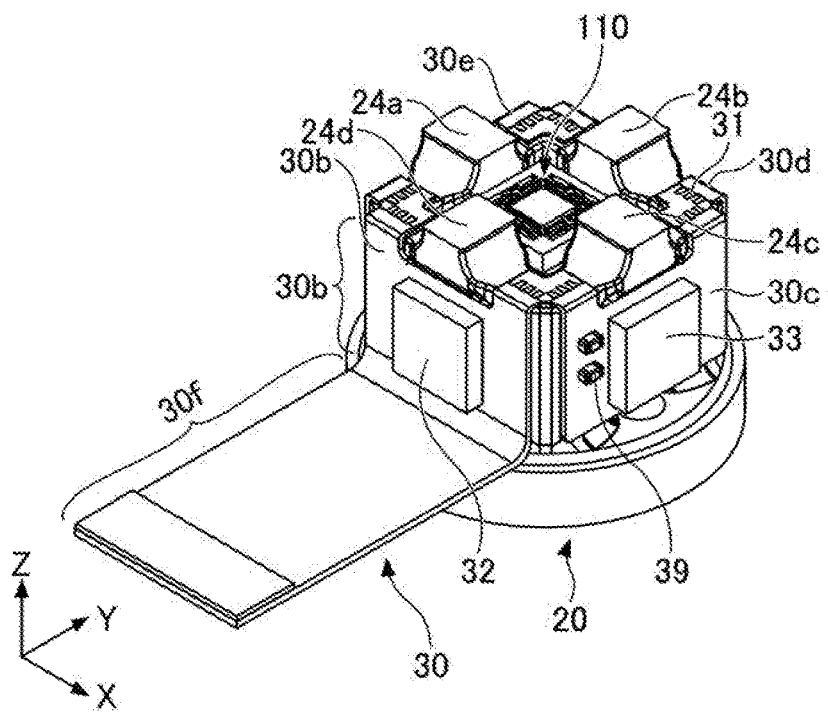
FIG. 13A and FIG. 13B are fourth drawings illustrating an example of the manufacturing process of the force torque sensor device 1.

The substrate 30 includes side surface fixing portions 30b to 30e that extend in four directions from the end face fixing portion 30a, that are bent relative to the end face fixing portion 30a, and that is fixed to the side surfaces of the columns 22a to 22d in the process of FIG. 13A.

In the present embodiment, the active component 32 is mounted on the side surface fixing portion 30b, the active component 33 and the passive component 39 are mounted on the side surface fixing portion 30c, the active component 34 and the passive component 39 are mounted on the side surface fixing portion 30d, and the active component 35 and the passive component 39 are mounted on the side surface fixing portion 30e. However, the active components are not required to be mounted on all of the side surface fixing portions 30b to 30e, and may be mounted on at least one of the side surface fixing portion 30b, 30c, 30d, or 30e.

The substrate 30 includes an extending portion 30f extending from the side surface fixing portion 30b. At an end of the extending portion 30f, an input/output terminal (which is not illustrated) capable of electrical input and output with an external circuit (such as a control device) connected to the force torque sensor device 1 is arranged.

Figure 12A:
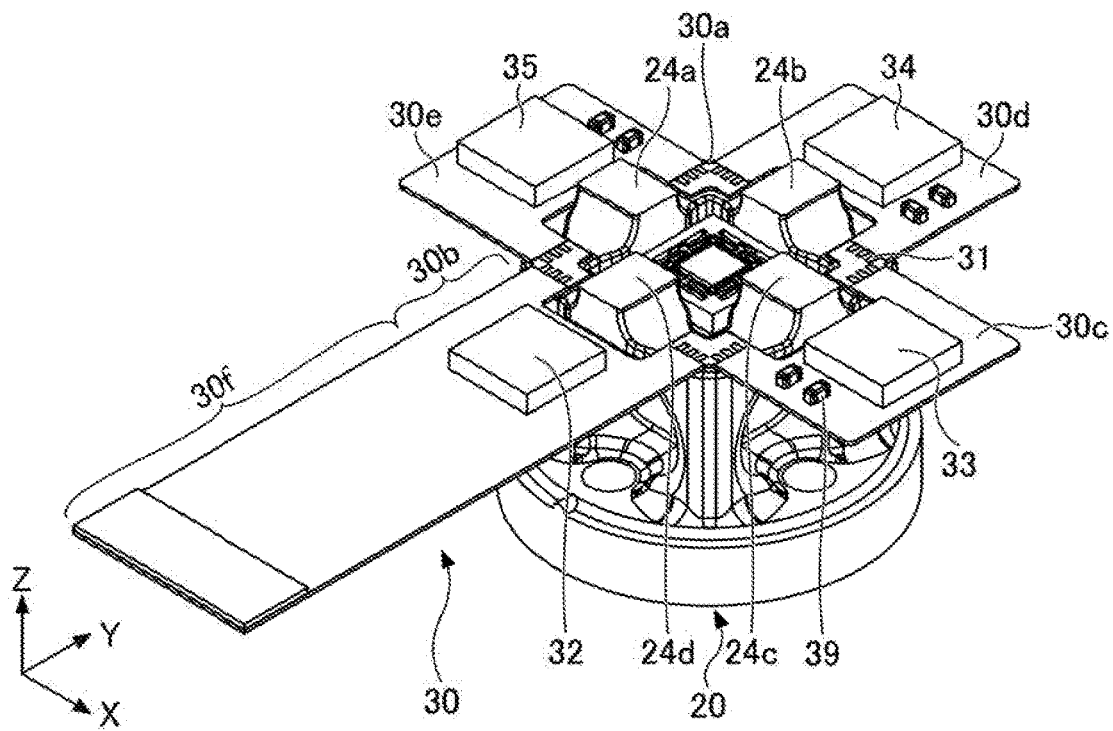
FIG. 12A and FIG. 12B are third drawings illustrating an example of the manufacturing process of the force torque sensor device 1.

The end face fixing portion 30a includes an opening 30x to expose the sensor chip 110 and the inputs 24a to 24d when the end face fixing portion 30a is fixed to the upper surface (i.e., the end surface) of the columns 22a to 22d in the process of FIG. 12A. The opening 30x extends from the end face fixing portion 30a to a portion of each of the side surface fixing portions 30b to 30e.

Thus, the outer shape of the substrate 30 may be, for example, a cross due to providing the opening 30x, ease of routing of wiring, and mounting the active components 32 to 35.

Next, in the process illustrated in FIG. 11, adhesives 42 are applied to the upper surfaces of the columns 22a to 22d. An epoxy-based adhesive may be used as the adhesive 42, for example. The adhesive 42 is used to fix the substrate 30 on the strain body 20. As no external force is applied, a general purpose adhesive can be used.

Next, in the process illustrated in FIG. 12A, the substrate 30 is disposed on the strain body 20 such that the lower surfaces of the four corners of the end face fixing portion 30a of the substrate 30 come in contact with the adhesives 42 applied to the upper surfaces of the columns 22a to 22d. At this time, the side surface fixing portions 30b to 30e are not bent relative to the end face fixing portion 30a.

Figure 12B:
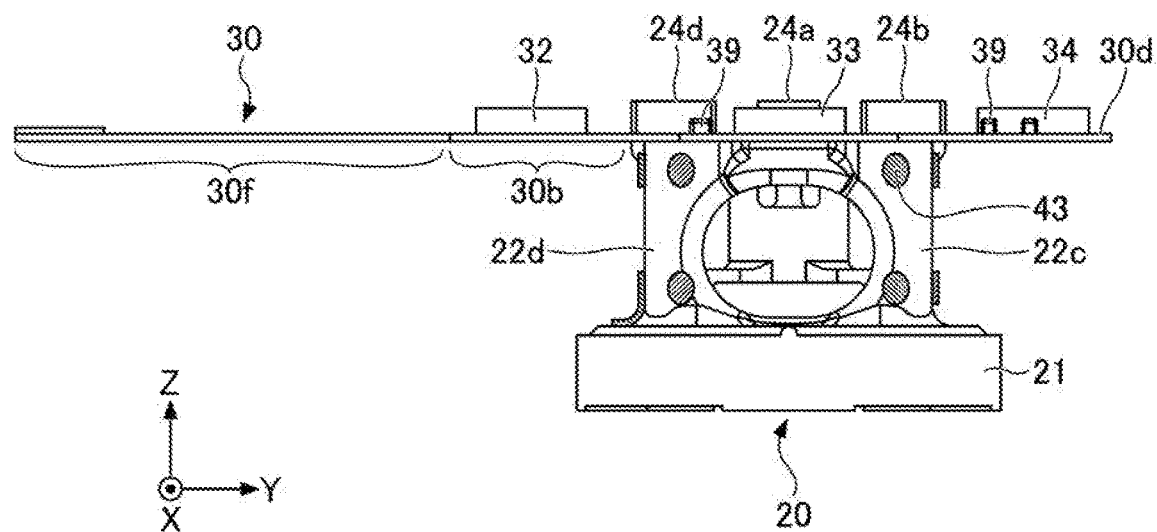

Next, in the process illustrated in FIG. 12B, the adhesives 43 are applied to two side surfaces of each of the columns 22a to 22d that face outward (e.g., two positions in the up and down direction). However, in an area bonded to a backside of a portion of the substrate 30 to which the active component 32 is mounted, the adhesive 43 is applied so as to extend from a lower side of the side surfaces of the columns 22a and 22d to a periphery of the upper surface of the base 21.

As the adhesive 43, an epoxy-based adhesive may be used, for example. The adhesive 43 is used to fix the substrate 30 on the strain body 20. As no external force is applied, a general purpose adhesive may be used. As adhesive 43, the same adhesive as the adhesive 42 may be used. Alternatively, a relatively stiff adhesive (i.e., an adhesive having a high Young's modulus) containing a filler may be used as the adhesive 42 to maintain wire bonding properties, and a relatively soft adhesive (having a low Young's modulus) may be used as the adhesive 43 to maintain flexibility to follow the deformation of the strain body 20. The adhesive 43 may be applied with the adhesive 42 in the process of FIG. 11.

Next, in the process illustrated in FIG. 13A, the side surface fixing portions 30b to 30e protruding horizontally from the end face fixing portion 30a disposed on the strain body 20 are bent toward each side surface of the strain body 20. While pressing the substrate 30 against the strain body 20, the adhesives 42 and 43 are heated to a predetermined temperature to be hardened. This fixes the substrate 30 to the strain body 20. Because the substrate 30 is a flexible substrate, is sufficiently soft relative to the strain body 20, and the substrate 30, and the strain body 20 are partially bonded, the substrate 30 does not interfere with the deformation of the strain body 20.

The electrode 31 of the substrate 30 and the corresponding electrode 15 of the sensor chip 110 are electrically coupled through a bonding wire (with is not illustrated), which is a metal wire, such as a gold wire or copper wire. In the substrate 30, the electrodes 31 are formed in the four corner areas of the end face fixing portion 30a that overlap the upper surfaces (i.e., the end surfaces) of the columns 22a to 22d in planar view. The upper surfaces (i.e., the end surfaces) of the columns 22a to 22d are areas having the least distortion when forces are applied to the inputs 24a to 24d. Thus, the areas are easily pressurized by ultrasonic waves, and wire bonding can be stably performed. The above-described process completes the force torque sensor device 1.

As described above, because the force torque sensor device 1 can be manufactured by using only three components of the sensor chip 110, the strain body 20, and the substrate 30, it is easy to assemble the components, and alignment of positions can be minimized. Therefore, the degradation in accuracy due to assembling can be suppressed.

In the strain body 20, because positions connecting to the sensor chip 110 (i.e., the upper surfaces of the columns 25a to 25e and the upper surfaces of the protrusions 27a to 27d) are all in the same plane, alignment of the sensor chip 110 with respect to the strain body 20 can be performed only once, and it is easy to mount the sensor chip 110 to the strain body 20.

Figure 13B:
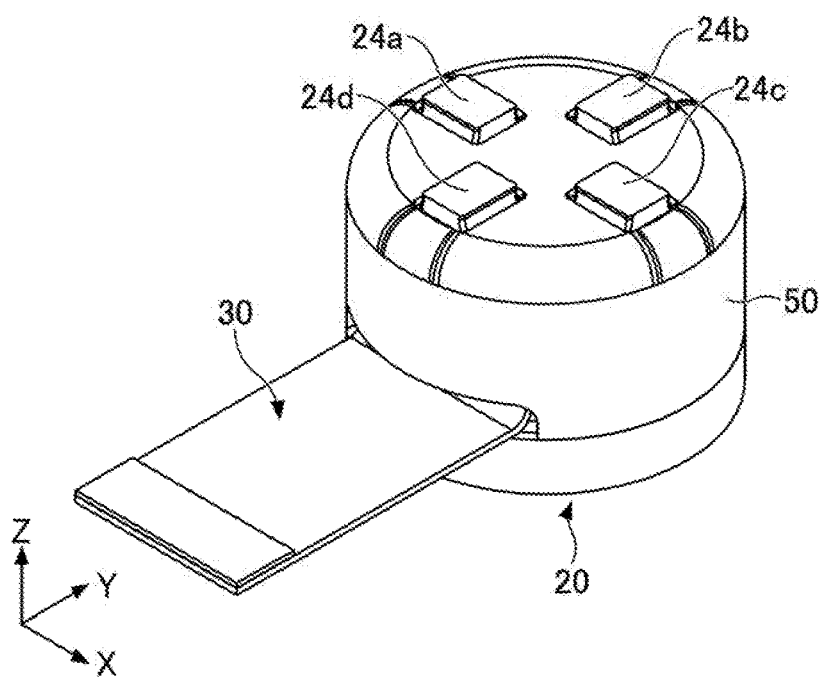

As illustrated in FIG. 13B, a process in which a cover is bonded may be provided. In the process illustrated in FIG. 13B, a cover 50 having an opening for exposing the inputs 24a to 24d is bonded to an outer periphery of the base 21 so as to cover the upper side of the strain body 20 from the base 21 and the sensor chip 110. As the cover 50, a material having nickel plating or the like performed on a surface of a metal material may be used, for example.

The substrate 30 is bonded on the strain body 20 and portions of the substrate 30 on which the active components 32 to 35 are mounted are within the height size of the strain body 20 when the substrate 30 is bent. Therefore, the substrate 30 does not interfere with the attachment of the cover 50.

Providing the cover 50 can prevent from dust and electrical noise. Particularly, noise resistance (i.e., signal stability) can be improved by electrically coupling the strain body 20 and cover 50, which are made of metal, to the ground (GND) of the substrate 30 by using silver paste or the like. In this case, the substrate 30 is preferably provided with a GND terminal of a series different from the sensor chip 110 and the active components 32 to 35, to electrically couple the GND terminal to the strain body 20 and the cover 50.

(Adhesive 41)

Here, the adhesive 41 that bonds the strain body 20 and the sensor chip 110 will be described in further detail.

Figure 14A:
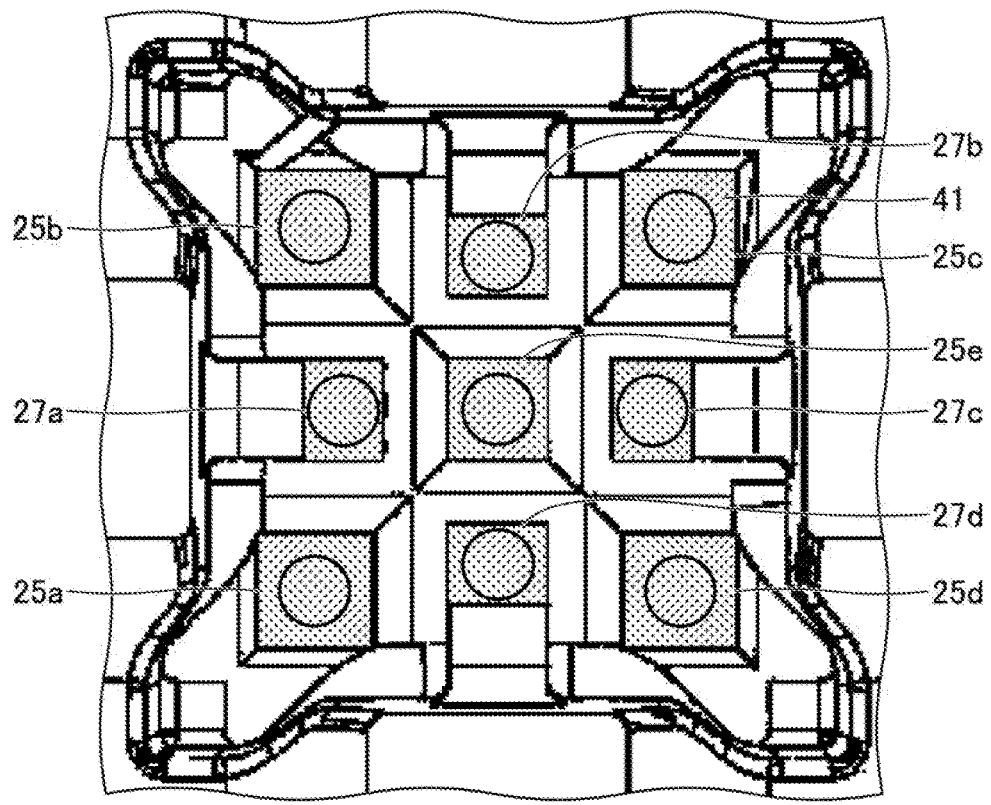
FIG. 14A and FIG. 14B are drawings for describing positions to which strain bodies and a sensor chip are bonded.
Figure 14B:
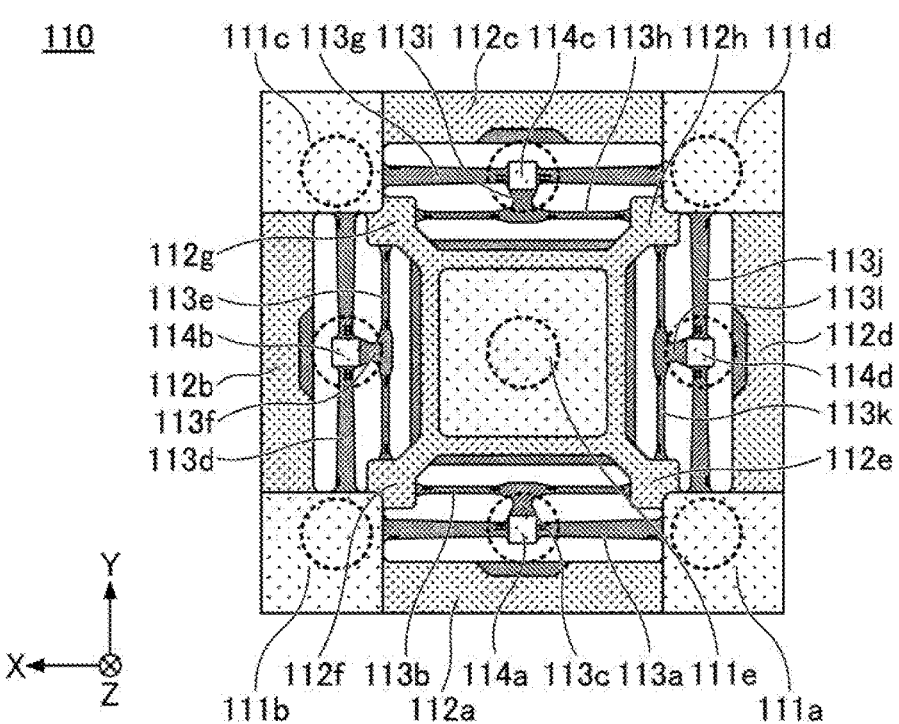

FIG. 14A is a plan view illustrating an enlarged view of the positions on the upper surfaces of the columns 25a to 25e and the upper surfaces of the protrusions 27a to 27d to which the adhesive 41 is applied. FIG. 14B is a bottom view illustrating positions on the lower surface of the sensor chip 110 that are in contact with the adhesive 41 applied to the upper surfaces of the columns 25a to 25e and the upper surfaces of the protrusions 27a to 27d.

Nine circles with solid lines illustrated in FIG. 14A and nine circles with dotted lines illustrated in FIG. 14B are bonded by the adhesive 41. Specifically, the columns 25a to 25e of the strain body 20 and the supports 111a to 111e of the sensor chip 110 are bonded by the adhesive 41. Additionally, the protrusions 27a to 27d of the strain body 20 and the force points 114a to 114d of the sensor chip 110 are bonded by the adhesive 41.

Among the nine positions, the protrusions 27a to 27d of the strain body 20 are portions that transmit the displacement of deformation caused by the external force to the force points 114a to 114d of the sensor chip 110. Thus, loss of displacement causes degradation of the sensor characteristics. Here, the degradation of the sensor characteristic is, for example, a decrease in the sensitivity and degradation in the linearity, and further accompanying, a decrease in noise resistance, a decrease in accuracy, or the like. In order to suppress the degradation of the sensor characteristics, it is preferable to select a highly stiff adhesive (i.e., an adhesive having a high Young's modulus) that can suppress displacement loss, as the adhesive 41.

The adhesive 41 requires, in addition to sensor characteristics, high reliability in a high temperature and high humidity environment, temperature cycling, and the like. In order to satisfy the requirement of high reliability, it is preferable to select an adhesive having little influence of degradation due to a temperature change or humidity (an adhesive having a low Young's modulus), as the adhesive 41.

That is, the adhesive 41 used to bond the strain body 20 and the sensor chip 110 has a range of a suitable Young's modulus in which increased reliability can be obtained while suppressing the degradation of the sensor characteristics.

The inventors have carefully studied and found that when the Young's modulus of the adhesive 41 is within the range greater than or equal to 500 MPa and less than or equal to 1.5 GPa, increased reliability can be obtained while suppressing the degradation of the sensor characteristics. This will be described in detail below.

It is preferable that the thickness of the adhesive 41 used to bond the strain body 20 and the sensor chip 110 is greater than or equal to 10 µm and less than or equal to 40 µm. When the adhesive 41 is formed of a resin, it is difficult to form the adhesive 41 less than or equal to 10 µm when a medium to high viscosity resin is used. The height of an adhesive potion with respect to the back surface of the sensor chip 110 varies depending on the method of manufacturing the strain body 20 and the presence or absence of postprocessing. In order to absorb the variation, the thickness of the adhesive 41 may be required to be about 40 µm.

According to the results of the investigation by the inventors, in the force torque sensor device, when an input displacement transmission rate is greater than or equal to 80%, the decrease in the sensitivity and the degradation in the linearity are within an allowable range as a product. Here, the input displacement transmission rate is a value indicating a percentage of displacement of the strain body 20 transmitted to the sensor chip 110 and is calculated by the following equation:

a displacement of the sensor chip 110/a displacement of the strain body 20×100[%].

Figure 15:
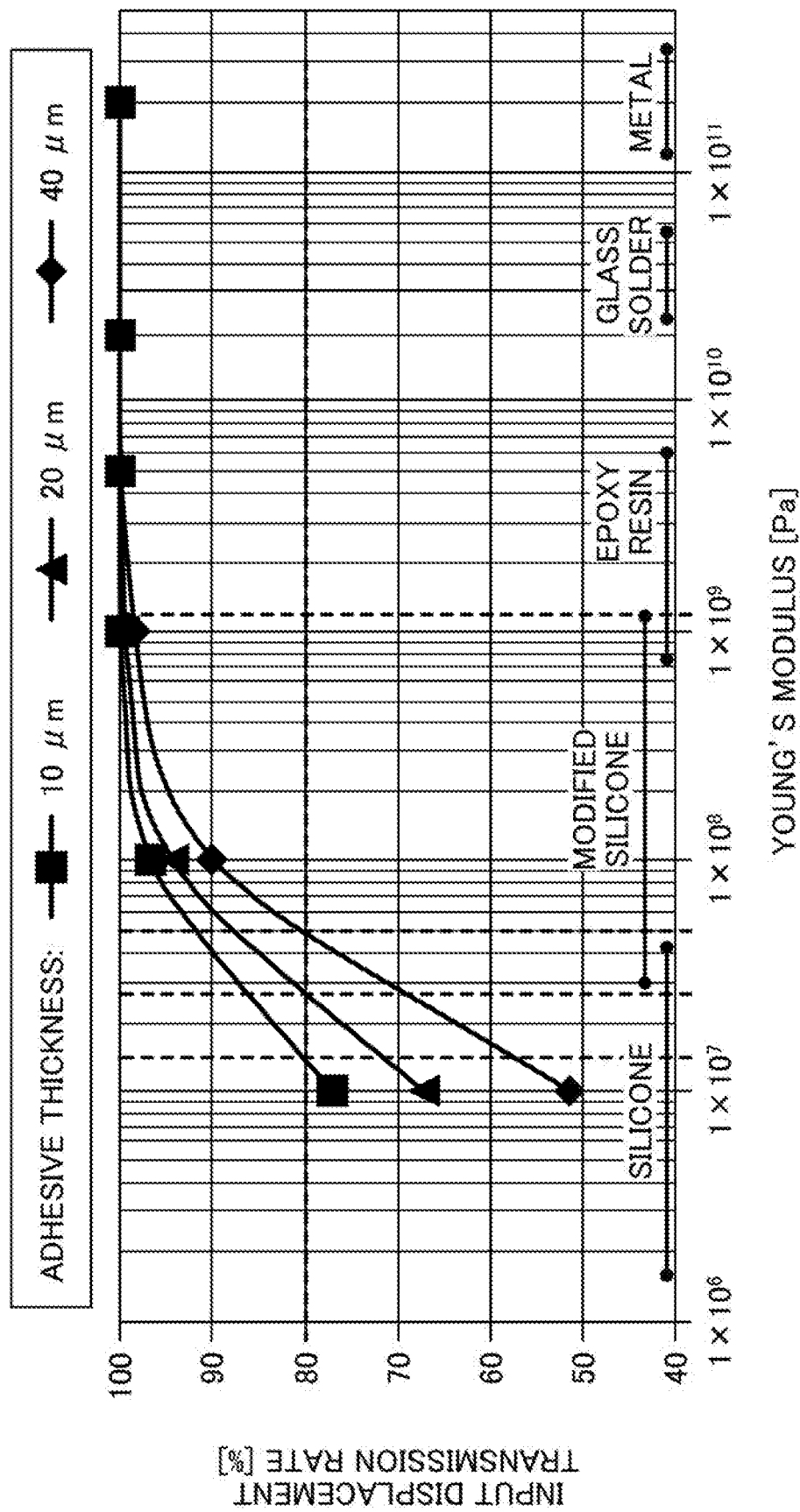
FIG. 15 is a drawing illustrating a relation between the Young's modulus of an adhesive and an input displacement transmission rate.

FIG. 15 is a drawing illustrating a relation between the Young's modulus of the adhesive and the input displacement transmission rate, and the thickness of the adhesive is used as a parameter.

As illustrated in FIG. 15, in the range of 10 μm to 40 μm in the thickness of the adhesive, the Young's modulus that satisfies the input displacement transfer rate greater than or equal to 80% is greater than or equal to 500 MPa. That is, if the Young's modulus is greater than or equal to 500 MPa, the decrease in the sensitivity and the degradation in the linearity are within the allowable range, and an adhesive can be used as the adhesive 41. With respect to the above, if the Young's modulus is less than 500 MPa, an adhesive cannot be used as the adhesive 41 because the decrease in the sensitivity and the degradation in the linearity are outside the allowable range.

Adhesives having a Young's modulus less than 500 MPa include silicone resins with a siloxane backbone chain. The silicone resins can solve the problems of reliability and a handling property, which have been problems of epoxy resins and inorganic adhesives. However, the silicone resins are not suitable for bonding the strain body 20 and the sensor chip 110 because the Young's modulus is small.

As described above, the Young's modulus that satisfies the input displacement transmission rate greater than or equal to 80% is greater than or equal to 500 MPa. In this range, the degradation of the sensor characteristic due to the displacement loss can be suppressed. However, when focusing the reliability, there is an upper limit on the Young's modulus, and the upper limit is 1.5 GPa.

As illustrated in FIG. 15, the input displacement transmission rate is approximately 100% when the Young's modulus is greater than 1.5 GPa in the range of the thickness of the adhesive from 10 μm to 40 μm. However, although adhesives in this range can sufficiently suppress the displacement loss, but the stiffness of adhesives is too large to achieve high reliability.

Adhesives having a Young's modulus greater than 1.5 GPa include low melting point glass and metal bonding (e.g., solder and metal diffusion bonding) for inorganic adhesives. These adhesives have the following characteristics in addition to the characteristic that increased reliability is not obtained.

The low melting point glass is required to be at a high temperature (e.g., about 500 degrees Celsius) at the time of welding. The temperature significantly exceeds the heat resistance temperature of the metal wiring of the sensor chip 110 or significantly exceeds the heat resistance temperature of the resin substrate or the flexible printed circuit board when the resin substrate or the flexible printed circuit board is incorporated as a part. In comparison with organic adhesives, the handling property (i.e., ease of handling) is poor. Additionally, in a case of metal bonding, metal deposition or the like is required at a junction of the strain body 20 and the sensor chip 110, and the manufacturing process is complicated.

A typical example of an organic adhesive having a Young's modulus greater than 1.5 GPa is an epoxy resin, which has high strength, is easy to handle, and is commonly used in die bonds of semiconductor devices. However, the epoxy resin has problems in weather resistance and reliability. Specifically, the epoxy resin may deteriorate under high temperature and high humidity, and due to temperature cycling.

Another example of organic adhesives is a polyimide-based resin. In addition to not being able to obtain increased reliability, the polyimide-based resin has the following characteristics. Since the baking temperature of the polyimide-based resin is very high, the polyimide-based resin is naturally unusable when a resin substrate, a flexible printed circuit board, or the like is incorporated as a part, and there is a concern about damage to the sensor chip 110.

Thus, in the range of the thickness of the adhesive from 10 μm to 40 μm, if the Young's modulus of the adhesive 41 used to bond the strain body 20 and the sensor chip 110 is in the range greater than or equal to 500 MPa and less than or equal to 1.5 GPa, increased reliability can be obtained while suppressing the degradation of the sensor characteristics.

Adhesives having a Young's modulus greater than or equal to 500 MPa and less than or equal to 1.5 GPa include modified silicones. Examples of modified silicone materials include an epoxy modified silicone having an epoxy group in the side chain. Instead of an epoxy modified silicone, a polyester modified silicone, a urethane modified silicone, an acrylic modified silicone, or the like may be used.

Among the modified silicones described above, it is particularly preferable to use the epoxy modified silicone, which generally have a relatively high Young's modulus. Moreover, because the epoxy-modified silicone has higher toughness than epoxy, vibration resistance and adhesion are improved relative to a case of using conventional epoxy adhesives.

As can be seen from FIG. 15, even if the Young's modulus is less than 500 MPa, the input displacement transmission rate may be greater than or equal to 80%. In this case, the adhesive composition may be suitably used as the adhesive 41.

That is, when considering of thinning an adhesive, a preferable range of the Young's modulus of the adhesive 41 is greater than or equal to 130 MPa and less than or equal to 1.5 GPa (when the thickness is 10 μm), greater than or equal to 250 MPa and less than or equal to 1.5 GPa (when the thickness is greater than or equal to 10 μm and less than or equal to 20 μm), and greater than or equal to 500 MPa and less than or equal to 1.5 GPa (when the thickness is greater than or equal to 10 m and less than or equal to 40 μm thick).

Considering that it is preferable to use an adhesive having a wide thickness range for manufacturing, the range of the Young's modulus of the adhesive 41 is preferably a range greater than or equal to 250 MPa and less than or equal to 1.5 GPa (when the thickness is greater than or equal to 10 μm thick and less than or equal to 20 μm) relative to the range greater than or equal to 130 MPa and less than or equal to 1.5 GPa (when the thickness is 10 μm). The range of the Young's modulus of the adhesive 41 is further preferably a range greater than or equal to 500 MPa and less than or equal to 1.5 GPa (when the thickness is greater than or equal to 10 μm and less than or equal to 40 μm).

Although the embodiments have been described in detail above, the invention is not limited to the above-described embodiments. Various modifications and substitutions can be made to the above-described embodiments without departing from the scope of the claims.

What is claimed is:

1. A force torque sensor device comprising:
a sensor chip that detects a displacement in a predetermined axis direction, the sensor chip being a micro-electro-mechanical systems sensor chip;
a strain body that transmits an applied force to the sensor chip, the strain body being made of a metallic material; and
adhesives that bond the sensor chip to adhesive portions of the strain body,
wherein a Young's modulus of each of the adhesives is greater than or equal to 500 MPa and less than or equal to 1.5 GPa and a thickness of each of the adhesives is greater than or equal to 10 μm and less than or equal to 40 μm,
wherein the sensor chip is formed of a silicon semiconductor substrate and includes:
    a plurality of supports bonded to the strain body to fix the sensor chip to the stain body; and
    a plurality of force points bonded to the adhesive portions of the strain body by the adhesives to transmit the applied force to the sensor chip,
wherein the strain body includes beams having protrusions and the adhesive portions are surfaces of the protrusions,
wherein the applied force deforms the beams of the strain body to displace the protrusions, and the adhesives bond the force points of the sensor chip to the surfaces of the protrusions so that the displacement of the protrusions is transmitted to the force points of the sensor chip, and
wherein each of the adhesives is a modified silicone.

2. The force torque sensor device as claimed in claim 1, wherein the modified silicone is an epoxy modified silicone, a polyester modified silicone, a urethane modified silicone, or an acrylic modified silicone.

3. The force torque sensor device as claimed in claim 1, wherein the metallic material is a stainless steel.

* * * * *